(12) United States Patent
Jaggi et al.

(10) Patent No.: US 12,190,722 B2
(45) Date of Patent: Jan. 7, 2025

(54) METHOD AND SYSTEM FOR TRAFFIC SIGNAL CONTROL WITH A LEARNED MODEL

(71) Applicant: THE GOVERNING COUNCIL OF THE UNIVERSITY OF TORONTO, Toronto (CA)

(72) Inventors: Parth Jaggi, Toronto (CA); Scott Sanner, Scarborough (CA); Baher Abdulhai, Mississauga (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 396 days.

(21) Appl. No.: 17/838,772

(22) Filed: Jun. 13, 2022

(65) Prior Publication Data

US 2022/0398921 A1 Dec. 15, 2022

Related U.S. Application Data

(60) Provisional application No. 63/202,508, filed on Jun. 14, 2021.

(51) Int. Cl.
| | | |
|---|---|---|
| *G08G 1/08* | (2006.01) | |
| *G06N 5/01* | (2023.01) | |
| *G06N 7/01* | (2023.01) | |
| *G06N 20/00* | (2019.01) | |
| *G08G 1/01* | (2006.01) | |
| *G08G 1/082* | (2006.01) | |

(52) U.S. Cl.
CPC .............. *G08G 1/08* (2013.01); *G06N 5/01* (2023.01); *G06N 7/01* (2023.01); *G06N 20/00* (2019.01); *G08G 1/0129* (2013.01); *G08G 1/082* (2013.01)

(58) Field of Classification Search
CPC ........ G08G 1/08; G08G 1/0129; G08G 1/082; G08G 1/0112; G08G 1/0145; G08G 1/04; G08G 1/052; G08G 1/0116; G06N 5/01; G06N 7/01; G06N 20/00; G06N 3/092
USPC ........................................................ 340/932
See application file for complete search history.

(56) References Cited

U.S. PATENT DOCUMENTS

| | | | |
|---|---|---|---|
| 10,490,066 B2 * | 11/2019 | Green | G08G 1/0133 |
| 2018/0190111 A1 * | 7/2018 | Green | G08G 1/052 |

OTHER PUBLICATIONS

"Considerations for model-based traffic control". In: Transportation Research Part C: Emerging Technologies 35 (2013), pp. 1-19. ISSN: 0968-090X.

(Continued)

*Primary Examiner* — Eric Blount
(74) *Attorney, Agent, or Firm* — Bhole IP Law; Anil Bhole; Marc Lampert

(57) ABSTRACT

There is provided a system and method for traffic signal control of a traffic network with a learned model. The method including: receiving sensor readings from the traffic network, the sensor readings including positions and speeds of vehicles approaching each intersection; using a learned dynamics model that takes the sensor readings as input, predicting a plurality of possibilities for position and velocity of the vehicles approaching each intersection in a future timestep; determining a action for the one or more intersections by performing a tree search on the plurality of possibilities and selecting the possibility with a highest action value; and outputting the action to the traffic network for implementation as a traffic control action at the one or more intersections.

20 Claims, 16 Drawing Sheets

(56) References Cited

OTHER PUBLICATIONS

A Kotsialos, M Papageorgiou, and A Messner. "Integrated optimal control of motorway traffic networks". In: Proceedings of the 1999 American Control Conference {Cat. No. 99CH36251}. vol. 3. IEEE. 1999, pp. 2183-2187.
A. Oroojlooy, M. Nazari, D. Hajinezhad, and J. Silva, "Attendlight: Universal attention-based reinforcement learning model for traffic signal control," arXiv preprint arXiv:2010.05772, 2020.
Afshin Oroojlooy et al. "AttendLight: Universal Attention-Based Reinforcement Learning Model for Traffic Signal Control". In: arXiv preprint arXiv:2010.05772 (2020).
AG Sims and KW Dobinson. "SCAT the Sydney coordinated adaptive traffic system: philosophy and benefits". In: International Symposium on Traffic Control Systems, 1979, Berkeley, California, USA. vol. 2. 1979.
Ali Mekky and Planning—An Economic Enabler. "The Cost of Congestion in the Greater Toronto Area". In: 2007 Annual Conference and Exhibition of the Transportation Association of Canada.
B. Abramson, "Expected-outcome: A general model of static evaluation, "IEEE transactions on pattern analysis and machine intelligence, vol. 12, No. 2, pp. 182-193, 1990.
Peter Auer, Nicolo Cesa-Bianchi, and Paul Fischer. "Finite-time analysis of the multiarmed bandit problem". In: Machine learning 47.2 (2002), pp. 235-256.
Carlos E. Garcia, David M. Prett, and Manfred Morari. "Model predictive control: Theory and practice—A survey". In: Automatica 25.3 (1989), pp. 335-348. ISSN: 0005-1098.
Carlos F Daganzo. "The cell transmission model: A dynamic representation of highway traffic consistent with the hydrodynamic theory". In: Transportation Research Part B: Methodological 28.4 (1994), pp. 269-287.
Cathy Wu et al. "Flow: Architecture and benchmarking for reinforcement learning in traffic control". In: arXiv preprint arXiv:1710.05465 10 (2017).
Chiyuan Zhang et al. Understanding deep learning requires rethinking generalization. 2017. arXiv: 1611.03530 [cs.LG].
Christopher JCH Watkins and Peter Dayan. "Q-learning". In: Machine learning 8.3-4 (1992), pp. 279-292.
Dan Horgan et al. Distributed Prioritized Experience Repla y. 2018. arXiv: 1803. 00933 [cs. LG].
David Silver et al. "Mastering the game of Go with deep neural networks and tree search". In: nature 529.7587 (2016), pp. 484-489.
David Silver et al. "Mastering the game of go without human knowledge". In: nature 550. 7676 (2017), pp. 354-359.
David Silver et al. "The predictron: End-to-end learning and planning". In: International Conference on Machine Learning. PMLR. 2017, pp. 3191-3199.
Eric Liang et al. "Ray RLLib: A Composable and Scalable Reinforcement Learning Library". In: CoRR abs/1712.09381 (2017). arXiv: 1712.09381. URL: http://arxiv.org/abs/1712.09381.
Eric Liang et al. "RLlib: Abstractions for distributed reinforcement learning". In: International Conference on Machine Learning. PMLR. 2018, pp. 3053-3062.
GCK Wong and SC Wong. "A multi-class traffic flow model an extension of LWR model with heterogeneous drivers". In: Transportation Research Part A: Policy and Practice 36.9 (2002), pp. 827-841.
Gerald Tesauro and Gregory Galperin. "On-line policy improvement using Monte-Carlo search". In: Advances in Neural Information Processing Systems 9 (1996), pp. 1068-1074.
Gerald Tesauro. "TD-Gammon, a self-teaching backgammon program, achieves master-level play". In: Neural computation 6.2 (1994), pp. 215-219.
Gerd Brewka. "Artificial intelligence—a modern approach by Stuart Russell and Peter Norvig, Prentice Hall. Series in Artificial Intelligence, Englewood Cliffs, NJ." In: The Knowledge Engineering Review 11.1 (1996), pp. 78-79.

Greg Brockman et al. "Openai gym". In: arXiv preprint arXiv:1606.01540 (2016).
Paul I Richards. "Shock waves on the highway". In: Operations research 4.1 (1956), pp. 42-51.
Hado van Hasselt, Arthur Guez, and David Silver. "Deep Reinforcement Learning with Double Q-learning". In: CoRR abs/1509.06461 (2015). arXiv: 1509.06461. URL: http://arxiv.org/abs/1509.06461.
Hua Wei et al. "PressLight: Learning Max Pressure Control to Coordinate Traffic Signals in Arterial Network". In: Proceedings of the 25th ACM SIGKDD International Conference on Knowledge Discovery f3 Data Mining. ACM. 2019, pp. 1290-1298.
I. Guilliard et al. "A Non-homogenous Time Mixed Integer LP Formulation for Traffic Signal Control". In: Transport Research Record (TRR): Journal of the Transport Research Board 2525 (2016).
Patrick Mannion, Jim Duggan, and Enda Howley. "An experimental review of reinforcement learning algorithms for adaptive traffic signal control" . In: Autonomic road transport support systems (2016), pp. 47-66.
Jean-Jacques Henry, Jean Loup Farges, and Jean Tuffal. "The PRODYN real time traffic algorithm". In: Control in Transportation Systems. Elsevier, 1984, pp. 305-310.
Jennie Lioris, Alex Kurzhanskiy, and Pravin Varaiya. "Adaptive max pressure control of network of signalized intersections". In: IFAC-PapersOnLine 49.22 (2016), pp. 19-24.
John Schulman et al. "Proximal policy optimization algorithms". In: arXiv preprint arXiv:1707.06347 (2017).
John Schulman et al. "Trust region policy optimization". In: International conference on machine learning. PMLR. 2015, pp. 1889-1897.
Jordi Casas et al. "Traffic simulation with aimsun". In: Fundamentals of traffic simulation. Springer, 2010, pp. 173-232.
Juntao Gao et al. Adaptive Traffic Signal Control: Deep Reinforcement Learning Algorithm with Experience Replay and Target Network. 2017. arXiv: 1705.02755 [cs.NI].
K Larry Head, Pitu B Mirchandani, and Dennis Sheppard. Hierarchical framework for real-time traffic control. 1360. 1992.
LA Prashanth and Shalabh Bhatnagar. "Reinforcement learning with function approximation for traffic signal control". In: IEEE Transactions on Intelligent Transportation Systems 12.2 (2010), pp. 412-421.
Levente Kocsis and Csaba Szepesvari. "Bandit based monte-carlo planning". In: European conference on machine learning. Springer. 2006, pp. 282-293.
Ming Tan. "Multi-agent reinforcement learning: Independent vs. cooperative agents". In: Proceedings of the tenth international conference on machine learning. 1993, pp. 330-337.
Nathan H Gartner and Chronis Stamatiadis. "Optimization and Control of Urban Traffic Networks". In: Complex Dynamics of Traffic Management (2019), pp. 131-165.
Nathan H Gartner, Chronis Stamatiadis, and Philip J Tarnoff. "Development of advanced traffic signal control strategies for intelligent transportation systems: Multilevel design". In: Transportation Research Record 1494 (1995).
Nathan H Gartner. OPAC: A demand-responsive strategy for traffic signal control. 906. 1983.
Pablo Alvarez Lopez et al. "Microscopic Traffic Simulation using SUMO". In: The 21st IEEE International Conference on Intelligent Transportation Systems. IEEE, 2018. URL: https: //elib.dlr.de/124092/.
PB Hunt et al. SCOOT—a traffic responsive method of coordinating signals. Tech. rep. 1981.
Peter Koonce and Lee Rodegerdts. Traffic signal timing manual. Tech. rep. United States. Federal Highway Administration, 2008.
Philip J Tarnoff and Peter S Parsonson. "Selecting traffic signal control at individual intersections". In: NCHRP Report 233 (1981).
Pitu Mirchandani and Larry Head. "A real-time traffic signal control system: architecture, algorithms, and analysis". In: Transportation Research Part C: Emerging Technologies 9.6 (2001), pp. 415-432.
Pravin Varaiya. "Max pressure control of a network of signalized intersections". In: Transportation Research Part C: Emerging Technologies 36 (2013), pp. 177-195.

(56) References Cited

OTHER PUBLICATIONS

Remi Coulom. "Efficient selectivity and backup operators in Monte-Carlo tree search". In: International conference on computers and games. Springer. 2006, pp. 72-83.

Richard Dowling. Traffic analysis toolbox vol. vi: Definition, interpretation, and calculation of traffic analysis tools measures of effectiveness. Tech. rep. 2007.

Richard S Sutton and Andrew G Barto. Reinforcement learning: An introduction. MIT press, 2018.

Roger P Roess, Elena S Prassas, and William R McShane. Traffic engineering. Pearson/Prentice Hall, 2004.

S. James, G. Konidaris, and B. Rosman, "An analysis of monte carlo tree search," Proceedings of the AAAI Conference on Artificial Intelligence, vol. 31, No. 1, Feb. 2017. [Online]. https://ojs.aaai.org/index.php/AAAI/article/view/11028.

S. M. A. Shabestary et al. "Cycle-level vs. Second-by-Second Adaptive Traffic Signal Control using Deep Reinforcement Learning". In: 2020 IEEE 23rd International Conference on Intelligent Transportation Systems (ITSC). 2020, pp. 1-8.

Samah El-Tantawy and Baher Abdulhai. "Towards multi-agent reinforcement learning for integrated network of optimal traffic controllers (MARLIN-OTC)". In: Transportation Letters 2.2 (2010), pp. 89-110.

Samah El-Tantawy, et al.. "Multiagent reinforcement learning for integrated network of adaptive traffic signal controllers (MARLIN-AT SC)". In: IEEE Transactions on Intelligent Transportation Systems 14.3 (2013), pp. 1140-1150.

Shu Lin et al. "Efficient network-wide model-based predictive control for urban traffic networks". In: Transportation Research Part C: Emerging Technologies 24 (2012), pp. 122-140.

Soheil Mohamad Alizadeh Shabestary and Baher Abdulhai. "Deep learning vs. discrete reinforcement learning for adaptive traffic signal control". In: 2018 21st International Conference on Intelligent Transportation Systems (ITSC). IEEE. 2018, pp. 286-293.

Soheil Mohamad Alizadeh Shabestary et al. "Cycle-level vs. Second-by-Second Adaptive Traffic Signal Control using Deep Reinforcement Learning". In: 2020 IEEE 23rd International Conference on Intelligent Transportation Systems (ITSC). IEEE. 2020, pp. 1-8.

Soheil Mohamad Alizadeh Shabestary. "Deep Reinforcement Learning Approach to Multimodal Adaptive Traffic Signal Control". PhD thesis. 2019.

Soheil Mohamad Alizadeh Shabestray and Baher Abdulhai. "Multimodal intelligent Deep (MiND) Traffic Signal Controller". In: 2019 IEEE Intelligent Transportation Systems Conference (ITSC). IEEE. 2019, pp. 4532-4539.

Tian Tan et al. "Cooperative deep reinforcement learning for large-scale traffic grid signal control". In: IEEE transactions on cybernetics (2019).

Tianshu Chu et al. "Multi-agent deep reinforcement learning for large-scale traffic signal control". In: IEEE Transactions on Intelligent Transportation Systems 21.3 (2019), pp. 1086-1095.

Transportation Research Board and National Academies of Sciences, Engineering, and Medicine. Curbing Gridlock: Peak-Period Fees to Relieve Traffic Congestion—Special Report 242. vol. 1. Transportation Research Board, 1994.

Volodymyr Mnih et al. "Asynchronous methods for deep reinforcement learning". In: International conference on machine learning. PMLR. 2016, pp. 1928-1937.

Volodymyr Mnih et al. Playing Atari with Deep Reinforcement Learning. 2013. arXiv: 1312.5602 [cs. LG].

Wade Genders and Saiedeh Razavi. "Using a deep reinforcement learning agent for traffic signal control". In: arXiv pre print arXiv:1611.01142 (2016).

Yoav Shoham, Rob Powers, and Trond Grenager. Multi-agent reinforcement learning: a critical survey. Tech. rep. Technical report, Stanford University, 2003.

* cited by examiner

FIG. 7A (a) Selection
FIG. 7B (b) Expansion
FIG. 7C (c) Simulation
FIG. 7D (d) Backpropagation

METHOD AND SYSTEM FOR TRAFFIC SIGNAL CONTROL WITH A LEARNED MODEL

TECHNICAL FIELD

The following relates generally to traffic signal control, and more specifically, to a method and system for traffic signal control with a learned model.

BACKGROUND

Significant productivity is lost in the modern world due to traffic congestion with concomitant fuel wastage and increased urban pollution. As urban centres continue to attract new population with each passing year, inherent cost limitations to infrastructure changes creates an increased need for better and efficient traffic control solutions. Traffic signal control (TSC), and more specifically adaptive traffic signal controllers (ATSC), can be used to provide such solutions as they generally can optimize and modify signal timings based on a given objective or set of objectives.

SUMMARY

In an aspect, there is provided a method for traffic signal control with a learned model of a traffic network, the traffic network comprising one or more intersections and sensors associated with the intersections to determine vehicle traffic approaching each intersection, the method comprising at each timestep: receiving sensor readings from the traffic network, the sensor readings comprising positions and speeds of vehicles approaching each intersection; using a learned dynamics model that takes the sensor readings as input, predicting a plurality of possibilities for position and velocity of the vehicles approaching each intersection in a future timestep; determining an action for the one or more intersections by performing a tree search on the plurality of possibilities and selecting the possibility with a highest action value; and outputting the action to the traffic network for implementation as a traffic control action at the one or more intersections.

In a particular case of the method, the action comprises a traffic light action that comprises either an extend action or a change action, wherein the extend action extends a current phase and the change action changes the current phase to a next phase in a predefined phase cycle of a traffic light of the intersection.

In another case of the method, the dynamics model is trained using a simulation of traffic at the one or more intersections, the simulation artificially generates traffic demand that varies for each approach of each of the one or more intersections, where the change action is randomly selected.

In yet another case of the method, the dynamics model is trained using vehicle movement data collected from one or more intersections in real-life.

In yet another case of the method, the reinforcement model comprises a vehicle-level model that, for each vehicle, takes as input the position and the velocity of the vehicle on an associated lane, the position and velocity of a downstream vehicle, a phase history, and a current action, to predict the position and the velocity of the vehicle at the future timestep.

In yet another case of the method, the phase history comprises a timestep history of phases corresponding to the associated lane.

In yet another case of the method, the tree search comprises performing a Monte-Carlo Tree Search (MCTS).

In yet another case of the method, the MCTS comprises: using a tree policy, traversing a tree path to reach a leaf node; performing expansion where the leaf node is non-terminal; expanding the tree by adding child nodes to the leaf node; performing simulation using a rollout policy to simulate a trajectory up to a predetermined condition; and performing backup by updating action values of the traversed path inside the tree using the performed simulation.

In yet another case of the method, the tree policy comprises performing upper confidence bound selection.

In yet another case of the method, the rollout policy selects a random timestep between a minimum and a maximum green-light time to perform the change action, and repeats the selection until a single phase cycle is completed and rewards obtained over this cycle is used to estimate an initial state value.

In another aspect, there is provided a system for traffic signal control of a traffic network with a learned model, the traffic network comprising one or more intersections and sensors associated with the intersections to determine vehicle traffic approaching each intersection, the system comprising one or more processors and a data storage, the one or more processors configurable to execute at each timestep: an input module to receive sensor readings from the traffic network, the sensor readings comprising positions and speeds of vehicles approaching each intersection; a machine learning module to, using a trained dynamics model that takes the sensor readings as input, predict a plurality of possibilities for position and velocity of the vehicles approaching each intersection in a future timestep; a selection module to determine an action for the one or more intersections by performing a tree search on the plurality of possibilities and selecting the possibility with a highest action value; and an action module to output the action to the traffic network for implementation as a traffic control action at the one or more intersections.

In a particular case of the system, the action comprises a traffic light action that comprises either an extend action or a change action, wherein the extend action extends a current phase and the change action changes the current phase to a next phase in a predefined phase cycle of a traffic light of the intersection.

In another case of the system, the dynamics model is trained using a simulation of traffic at the one or more intersections, the simulation artificially generates traffic demand that varies for each approach of each of the one or more intersections, where the change action is randomly selected.

In yet another case of the system, the dynamics model is trained using vehicle movement data collected from one or more intersections in real-life.

In yet another case of the system, the reinforcement model comprises a vehicle-level model that, for each vehicle, takes as input the position and the velocity of the vehicle on an associated lane, the position and velocity of a downstream vehicle, the phase history, and the current action, to predict the position and the velocity of the vehicle at the future timestep.

In yet another case of the system, the phase history comprises a timestep history of phases corresponding to the associated lane.

In yet another case of the system, the tree search comprises performing a Monte-Carlo Tree Search (MCTS).

In yet another case of the system, the MCTS comprises: using a tree policy, traversing a tree path to reach a leaf node;

performing expansion where the leaf node is non-terminal; expanding the tree by adding child nodes to the leaf node; performing simulation using a rollout policy to simulate a trajectory up to a predetermined condition; and performing backup by updating action values of the traversed path inside the tree using the performed simulation.

In yet another case of the system, the tree policy comprises performing upper confidence bound selection.

In yet another case of the system, the rollout policy selects a random timestep between a minimum and a maximum green-light time to perform the change action, and repeats the selection until a single phase cycle is completed and rewards obtained over this cycle is used to estimate an initial state value.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
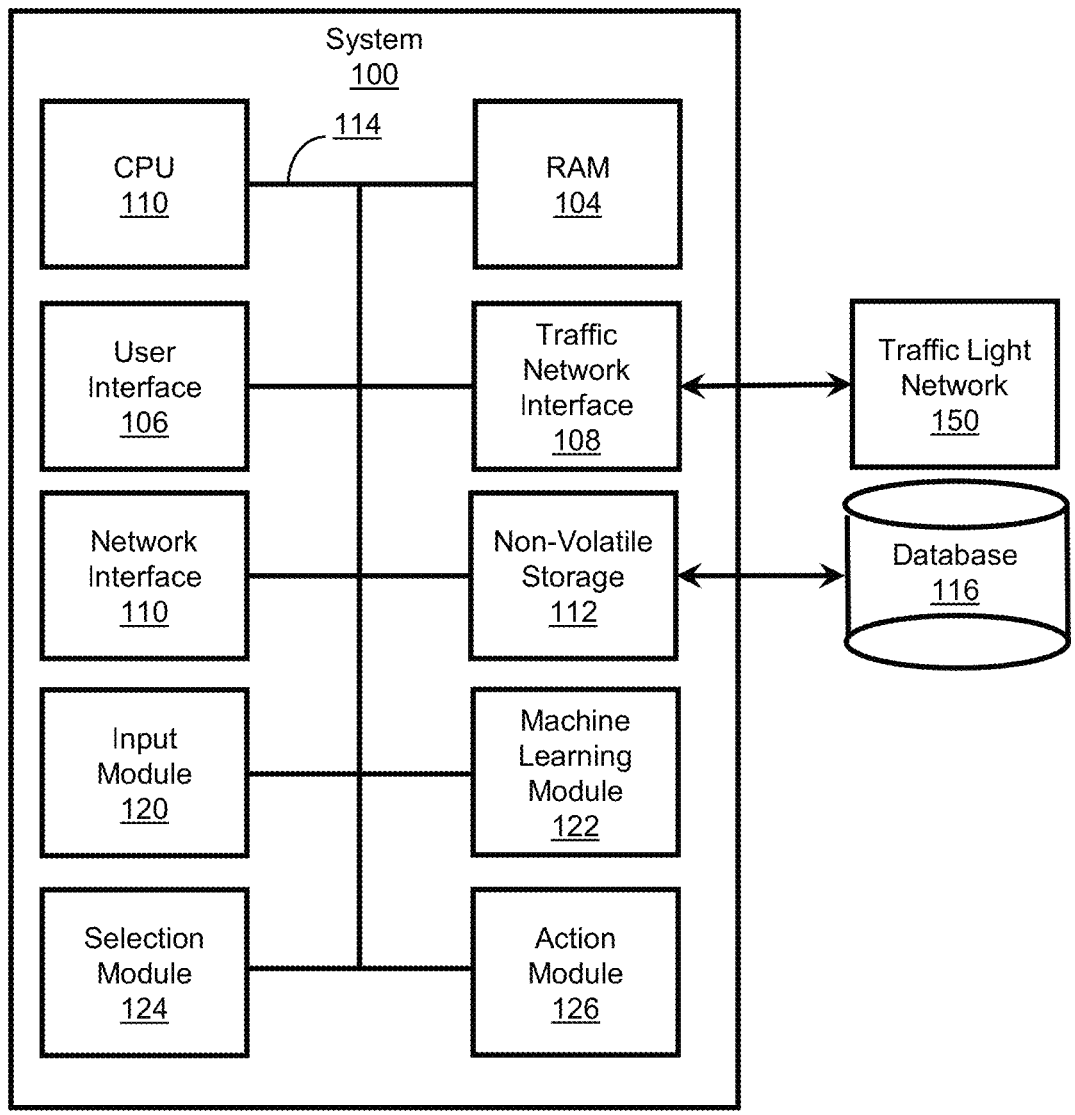
FIG. 1 is a schematic diagram of a system for traffic signal control of a traffic network with a learned model, in accordance with an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to traffic signal control, and more specifically, to a method and system for traffic signal control with a learned model.

In the search of efficient and optimal controllers, ATSCs that continuously optimize and modify signal timings based on a given objective or set of objectives can be used. These controllers are given access to a state which consists of different types of information generated from the current intersection, or also in some cases, upstream intersections. The controller utilizes this state to generate optimal actions with respect to a pre-defined objective.

At each timestep t, the traffic system generates state $s_t \in S$, which is received by the ATSC to generate policy if, which maps the state to actions, $a_t \in A$. The traffic system steps forward one timestep using the provided action and returns the agent reward $r_{t+1} \in R$ using the reward function R(s,a). The controller policy is generated such that it maximizes the expected discounted sum of rewards (expected return). The objective with respect to which the controller generates the action, can be altered by changing the reward function. It Is understood that 'timestep' as used herein can comprise any suitable time period (e.g., a millisecond), multiple time periods, or varying time periods.

A significant problem with many ATSCs is the inability to handle rich observations (e.g. position and speed of all vehicles within the detection area), so these controllers generally have to work with much coarser observations (e.g. traffic queues). Some controllers combine model-free reinforcement learning with function approximators, such as neural networks, to work with these richer observations. Though these model-free agents may work well in the traffic demands similar to the ones in which they are trained, in most situations where they face substantially different demands, they generally fail to generalize. This can significantly limit the ability to deploy such controllers in real life where they will certainly encounter unseen traffic demands. The trained agents also cannot generally be used for intersection layouts different from the training intersection layout. Embodiments of the present disclosure use a combination of a learned model of microscopic traffic dynamics and tree search mechanism to find optimal control decisions in order to advantageously work with rich traffic observations; while being capable of handling significant changes in traffic demands and adjust to various intersection layouts without the need for retraining.

Reinforcement Learning (RL) provides an approach for optimal traffic signal control strategy that can be used to build demand-responsive and self-learning adaptive traffic signal controllers (ATSC). Many approaches that use RL use or build upon Deep Q-Networks (DQN), which combines Q-learning with function approximators to produce results that outperform static and adaptive controllers. Evaluation of these trained controllers are generally performed on demands that are only superficially different or exactly the same as their training demand distributions. Since neural networks are generally excellent at memorization (even for randomly labelled data), it can be reasonably presumed that reinforcement learning based approaches can overfit to their training demand and may not function optimally under general traffic demands. The present embodiments address this substantial problem in the art by using model-based approaches that require relatively little data to train and generalize to a large number of out-of-training-distribution tasks. Contrary to model-free RL approaches, embodiments of the present disclosure can use a combination of a learned traffic dynamics model and a Monte Carlo Tree Search (MCTS). In contrast to model-free RL ATSCs, the present embodiments require relatively less data to train and is better able to generalize to unseen demands.

For reinforcement learning, a fully observable, single-agent task can be described as a Markov Decision Process (MDP) consisting of a tuple $G=\langle S, A, T, R, \gamma \rangle$. At each timestep t, the agent receives environment's state $s_t \in S$ and selects action $a_t \in A$ using the given state. The environment steps forward one timestep using the provided action and returns the agent reward $r_{t+1} \in \mathbb{R}$ using the reward function $R$ (s, a), and the next state $s_{t+1}$ using the transition function $T$. Discount factor for the MDP is $\gamma \in [0,1]$. RL algorithms attempt to improve the agent's policy $\pi$, which is defined as the mapping from received state S to the action a that is passed to the environment. These algorithms improve the policy such that it maximizes the expected discounted sum of rewards (expected return). With iterative learning, RL approaches aim for a final policy that closely approximates the optimal policy $\pi^*$, which has the highest possible expected return.

An assumption made in formulating the traffic signal controller (TSC) task is that an MDP is full observability or the Markov property being satisfied, which may not be true for all environment configurations. Traffic demand used in these environments could be based on Origin-Destination (O-D) matrices estimated from real-world datasets or be based on artificially generated traffic demand. Demands based on real-world datasets are generally non-stationary, in other words, non-Markov. Dealing with non-stationarity by augmenting the state with time attributes would be detrimental to learning a generalizable model-free controller as the real-world demand could significantly vary even for similar time attributes. Furthermore, the model-free agent would likely memorize future demands with respect to the provided time attribute within the state. In contrast, for model-based approaches, as described herein, memorization can be mitigated by using, for example, recent historical estimates of demand.

Figure 4:
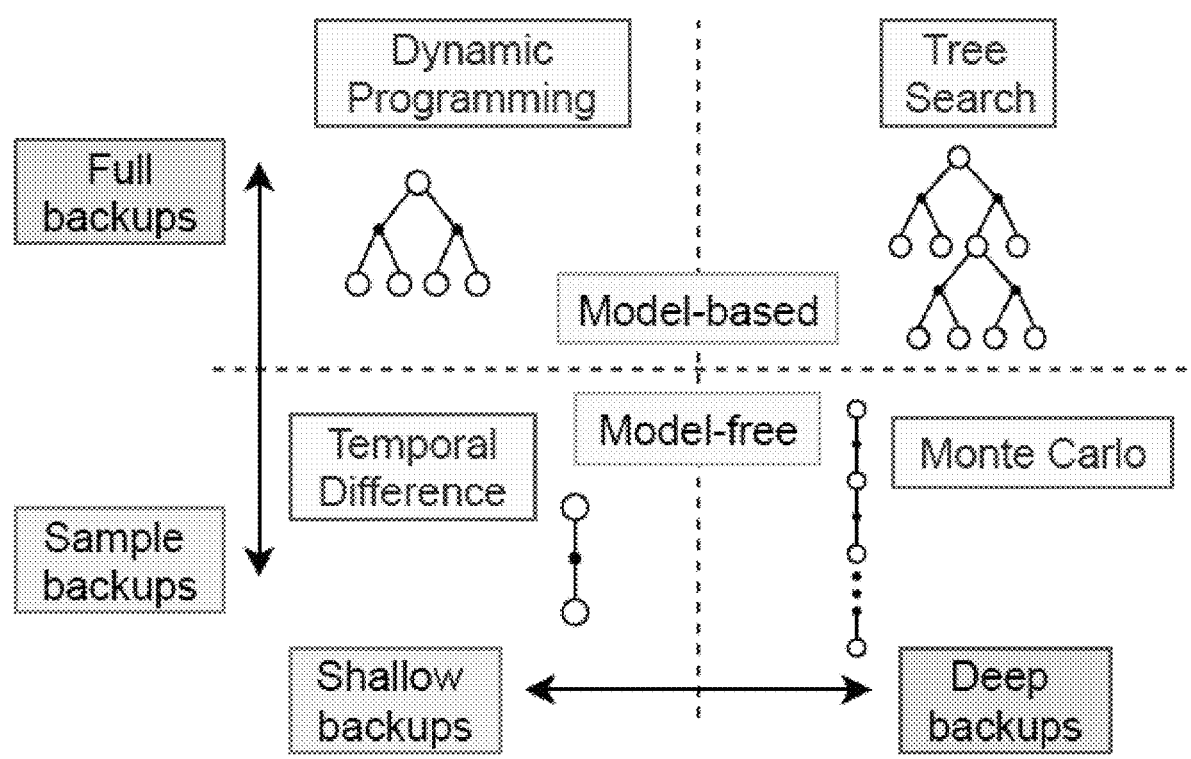
FIG. 4 is diagram illustrating four major quadrants of reinforcement learning.

There are generally four major categories of reinforcement learning approaches, differentiated based on different views of the backup operation fundamental to reasoning about future expected reward attainable from the current state. As shown in FIG. 4, the differentiation is mainly done based on two attributes: (i) whether a model (full backups) or agent experience (sample backups) is used to compute value estimates and (ii) whether we use one-step (shallow) backups or n-step (deep) backups to compute those estimates.

Model-free reinforcement learning (MFRL) approaches, such as Deep Q-Networks (DQN), generally provide ease of implementation and are able to learn incrementally from single step transitions. This is in contrast to Monte-Carlo approaches that generally require complete episodes to compute backups and therefore do not learn incrementally. Since the value function learned by the model-free approaches incorporate the agent policy and the environment dynamics within itself, these approaches only implicitly learn the transition dynamics. This means out-of-(training)-distribution dynamics (or for the task of traffic signal control, out-of-distribution demand) leads to sub-optimal policies through model-free approaches, as described herein. In contrast, model-based approaches learn the dynamics first and foremost, and then attempt to generate behaviors using the learned model.

Model-based reinforcement learning (MBRL) approaches provide options for shallow backups (dynamic programming) and deep backups (tree search). Dynamic programming (DP) can be difficult to implement due to its requirement for the complete distributional dynamics model and its need for working with the entire value function. The latter makes it impractical for problems with large state-spaces such as TSC, where storing and updating such sizable value functions is both time and space inefficient in practice. Meanwhile, tree search advantageously does not need to store the value function and can therefore work with increased efficiency as compared to DP approaches. Tree search algorithms can drive behaviors using exhaustive tree search, rollouts, Monte-Carlo Tree Search (MCTS), or the like.

Exhaustive tree search backups can become time inefficient due to the exponential growth of the tree size in the search horizon. However, rollouts provide a generally easy way to generate actions using a dynamics model, but can be inaccurate if state evaluations are noisy. MCTS builds on rollouts by selectively expanding the tree of future states based on existing evaluation of states within the tree, which allows it to perform efficient search; and thus, generate more accurate behavior generation over rollouts.

Figure 2:
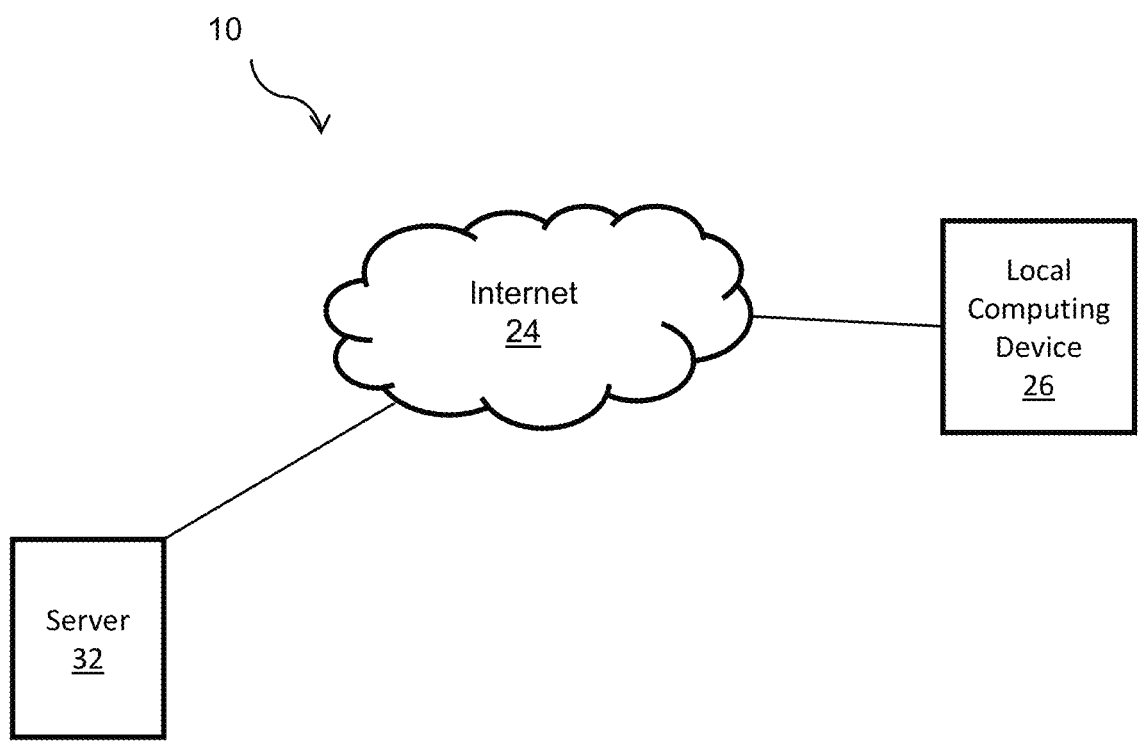
FIG. 2 is a schematic diagram showing the system of FIG. 1 and an exemplary operating environment.

Referring now to FIG. 1, a system 100 for traffic signal control in a traffic network with a learned model, in accordance with an embodiment, is shown. In this embodiment, the system 100 is run on a local computing device (26 in FIG. 2) and may access content located on a server (32 in FIG. 2) over a network, such as the internet (24 in FIG. 2). In further embodiments, the system 100 can be run on any suitable computing device; for example, the server (32 in FIG. 2). In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a central processing unit ("CPU") 102 (comprising one or more processors), random access memory ("RAM") 104, a user interface 106, a traffic network interface 108, a network interface 110, non-volatile storage 112, and a local bus 114 enabling CPU 102 to communicate with the other components. CPU 102 can execute an operating system, and various modules, as described herein. In further cases, the CPU 102 can execute the modules directly; such as in a hardware implementation. RAM 104 provides relatively responsive volatile storage to CPU 102. The user interface 106 enables, in some cases, an administrator or user to provide input via an input device, for example a keyboard and mouse. The user interface 106 can also output information to output devices to the user, such as a display and/or speakers. The traffic network interface 108 communicates with a traffic network 150 and receives sensor readings from the traffic network, as described herein. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, the operating system, the modules, and the related data may be retrieved from the non-volatile storage 112 and placed in RAM 104 to facilitate execution.

In an embodiment, the system 100 further includes, or executes on the one or more processors 110, a number of conceptual or physical modules, including an input module 120, a machine learning module 122, a selection module 124, and an action module 126. In some cases, the functions and/or operations of the input module 120, the machine learning module 122, the search 124, and the action module 126 can be combined or executed on other modules.

Figure 3:
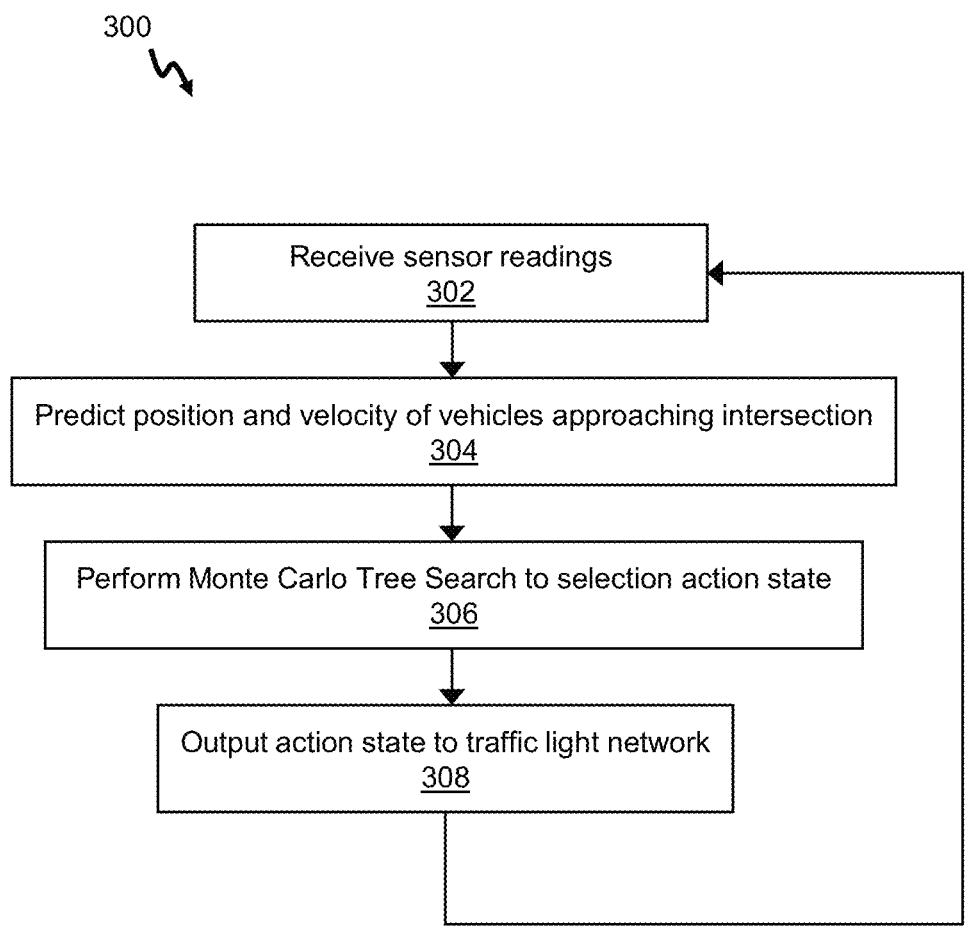
FIG. 3 is a flow chart of a method for traffic signal control of a traffic network with a learned model, in accordance with an embodiment.

FIG. 3 illustrates a method 300 for traffic signal control in a traffic network with a learned model, in accordance with an embodiment. Advantageously, using this method, a traffic lane can be rolled-forward in time. Since for most intersections, a lane is the simplest building-block of the intersection, this method allows simulation of future states of any arbitrary intersection by simulating the intersection's individual lanes.

At block 302, the data extraction module 122 receives sensor readings data from the traffic network 150 via the traffic network interface 108. In a particular case, the sensor readings comprise, at least, positions and speeds of vehicles approaching within a predetermined distance to a particular intersection.

At block 304, the machine learning module 122 uses a trained dynamics model (referred to as a learned microscopic dynamics model) to predict a plurality of possibilities for a position and velocity of vehicles approaching the intersection in a future timestep state $s_{t+1}$, using the position and speed of vehicles approaching the intersection (state $s_t$) and a current timestep action $a_t$. The position of each vehicle can be associated with a lane of the intersection in which the vehicle is situated and the speed can be associated with a direction of approach of the intersection. In some cases, the learned dynamics model can be updated periodically at different suitable timescales (e.g., hourly, daily, monthly, etc.) as new data becomes available.

The microscopic dynamics model can use edge-level models or lane-level models; however, preferably, vehicle-level models are used. Edge-level models jointly model the complete edge (consisting of multiple lanes) by learning a model that works with a multi-lane state and predicts the state at the next timestep. Lane-level models use a lane state to make the prediction. Vehicle-level models use vehicle states to make the prediction of future vehicle states. Vehicle-level models converge quickly owing to their simple state specification and their usage ensures conservation of vehicle count, which otherwise has to be learned by the lane-level and edge-level models.

The machine learning module 122 learns a vehicle-level model $m_{veh}$ that takes in position $l_{t-1}^i$ and speed $v_{t-1}^i$ of each vehicle ion lane j at timestep t-1. Additionally, in most cases, the vehicle-level model $m_{veh}$ takes as input position and velocity of next downstream vehicle i-1, phase history $\varphi_{t-1}^i$ and current action $a_{t-1}$ to predict the position and velocity of vehicle i at timestep t; as illustrated Equation (3) and FIG. 8. Vehicle i-1 is considered to be downstream from vehicle i if vehicle i-1 is in front of vehicle i and in the same lane as vehicle i. The phase history $\varphi_{t-1}^i$ is an x timestep history of phases corresponding to lane j. Timestep history for lane j includes the history of previous phases performed at a particular lane j. Items inside this timestep history object are generally binary; where 0's and 1's can correspond to red and green phases of that lane respectively. In some cases, for a first iteration, the timestep history can be initialized with all items as 0. In an example, x is set to 10 after hyperparameter search. Hyperparameter search can involve varying a particular parameter (in this case, a number of timesteps of phase history) to identify the parameter value that achieves the best performance on a dataset.

In most cases, position $I_i \in [0,1]$ and velocity $v_i \in [0,1]$ inputs can be normalized by dividing them with the detection length and the lane speed limit of the lane, respectively. The agent cannot or will not be able to observe any vehicles beyond the detection length (for example, 200 meters from the intersection). Lane speed limits can be in accordance with the road network configuration.

The learned vehicle-level model $m_{veh}$, can effectively act like a simulator that is specifically learned from observational data and at a much lower computational cost compared to a full microsimulator. The vehicle-level model $m_{veh}$, can be trained using sensor readings from real life vehicle trajectories (position and velocity); the sensor readings can come from, for example, connected vehicles or high-fidelity video detection. In other cases, the vehicle-level model $m_{veh}$, can be trained using a full traffic microsimulator.

At block 306, the selection module 124 performs a tree search, preferably a Monte Carlo Tree Search (MCTS), to select an action. The selection is between an Extend action and a Change action. The tree search is used to optimize an action policy for the current state $s_t$ by simulating different forward trajectories using the vehicle-level model $m_{veh}$. Each node on the tree corresponds to particular state of the intersection, where the state of intersection represents the position and velocity of vehicles within the detected area. Child nodes (from a node $n_t$) correspond to states that can be reached from node $n_t$ by performing actions for a traffic light phase. Vehicle-level model $m_{veh}$, is used to predict the state of different child nodes by propagating the vehicles forward in time based on the actions selected. MCTS creates a tree of future states by incrementally adding nodes on certain branches with each sampled trajectory (also referred to as possibility). The selection module 124 rolls out the traffic network states using the vehicle-level model $m_{veh}$ and employs MCTS for traffic light action optimization.

Thus, at each timestep there is possibility for the the selection module 124 to choose from one of the two actions, the Extend and the Change action. Extend action refers to extending the current phase for another timestep while the Change action refers to changing the current phase to the next phase in a predefined phase cycle of the traffic lights at the intersection. Since the model simulates timesteps forward in time for both these branches, each branch will have a particular current timestep action $a_t$. For example, when simulating forward using the model for the Change action branch, the model is provided with the Change action as the current timestep action, which, as describe herein, can be an input variable to the dynamics model.

A policy used to traverse the tree is called a tree policy and is generally different from a rollout policy used for evaluation of leaf nodes. In particular cases, the selection module 124 can employ an Upper Confidence Bound (UCB) selection. UCB uses already generated node value estimates to balance between exploration and exploitation. UCB, as shown in Equation (2), selects an action for state $s_t$ at timestep t, using current action-value estimates $Q_t$, an action selection counter $N_t$, and a constant c that controls the degree of exploration. Simulated returns from state-action pairs are averaged to estimate the pair's value. Thus, MCTS includes: selection by using the tree policy to reach a leaf node; expansion where if the leaf node is non-terminal, expanding the tree by adding child nodes to the leaf node; simulation by using a rollout policy to simulate a trajectory up to a terminal state or some predefined horizon; and backup by updating action values of the traversed path inside the tree using returns of the simulated episode. The rollout policy used for leaf node evaluation can pick a random timestep between a minimum and a maximum green-light time of the intersection to perform a change action. The selection module 124 can repeat this until a single phase cycle is completed and the rewards obtained over this cycle are used to estimate the initial state's value. In an example, five node evaluations are performed for each leaf node to reduce bias in value estimates.

Action-value estimates $Q^\pi(s, a)$ correspond to the expected sum of discounted rewards if the agent performs action a at state s and follows policy it from there onwards. If $s_t$ and $a_t$ corresponds to state and action at time t respectively, action-value estimates $Q^\pi(s, a)$ can be determined as:

$$Q^\pi(s,a) = \mathbb{E}_\pi[\Sigma_k^\infty \gamma^k r_{t+k+1} | s_t=s, a_t=a] \quad (0)$$

Action selection counter $N_t$ (or node visitation counter) represents the number of times a state or node has been visited. It is generally used in Equation (2) to select an action in the Selection step of MCTS. Different values of the constant c can be used, and the performance of can be evaluated for each; similar to hyperparameter search described herein.

Various suitable reward functions can be used. In the present case, Queue reward is used as the reward function. For the case of using the Queue reward, the reward can be a negated sum of queue lengths over all lanes of the intersection. Vehicles travelling below a threshold speed (for example, 2 meters/second) are considered to be part of the queue.

As described, the present embodiments perform the simulation by performing a rollout using a rollout policy. Given the actions of the rollout policy, the agent uses the dynamics vehicle model $m_{veh}$ to predict future states and rewards. With reinforcement learning, returns of the simulation are a cumulative sum of discounted rewards. Since the action values ns, a) are expected returns or expected sum of discounted rewards, the updated action value can be reached by averaging over previously collected returns from the given state-action pair.

Generally, each traffic light in an intersection has a sequence of pre-defined phases, with each phase having its own predefined minimum and maximum time, representing the phase cycle. An initial state is the state from which the agent simulates forward different possibilities. The current state is the state in which an action is to be determined. The rewards received during rollouts is used to update the initial state's value $Q^\pi(s_i, a)$ using Equation (0), where $s_i$ refers to the initial state. After performing value updating, as described herein, the action values $Q^\pi(s_i, a_0)$ and $Q^\pi(s_i, a_1)$, corresponding to the extend and change actions at the initial state, can be determined. Since the general objective is to maximize expected returns, the action that corresponds with the higher action value is selected.

At block 308, the action module 126 outputs the action selection as a traffic control action for the traffic lights in the intersection via the traffic network interface 108. In most cases, the system 100 can return to block 302 in order to determine the next action.

Figure 14:
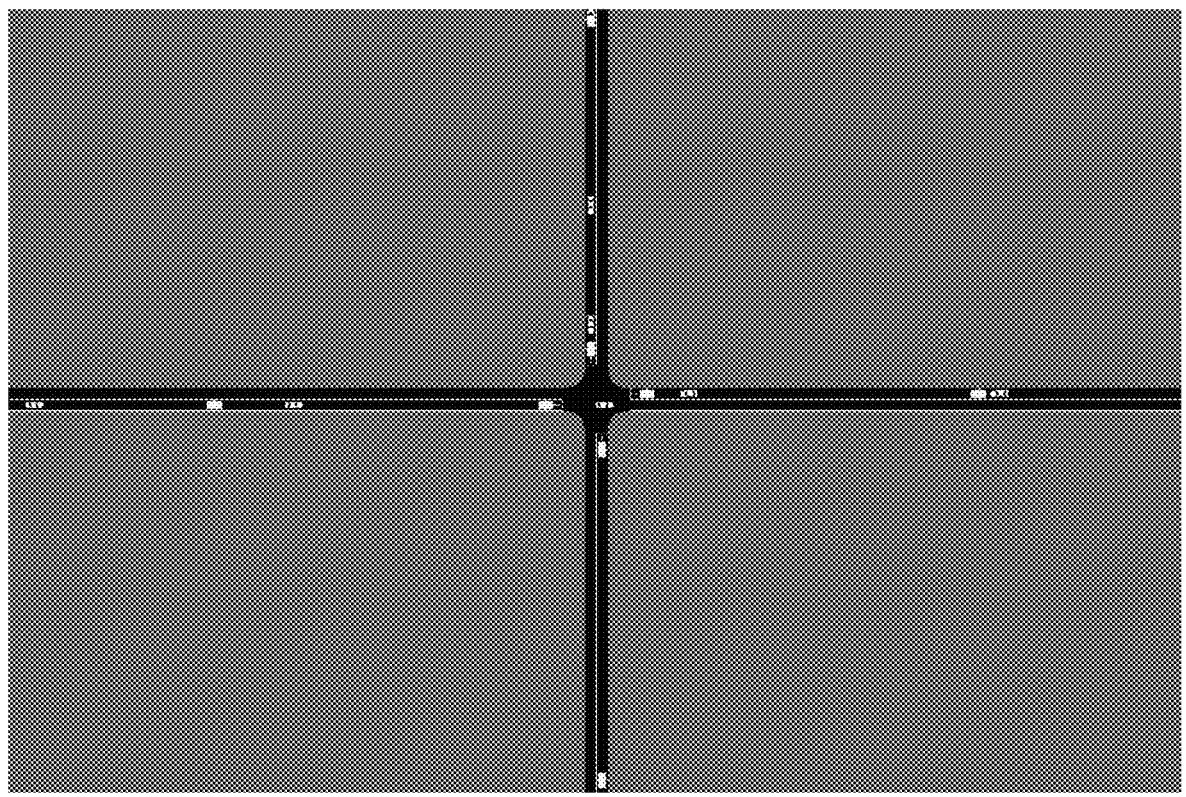
FIG. 14 is an example of an artificially generated traffic network used for a demonstration.
Figure 15:
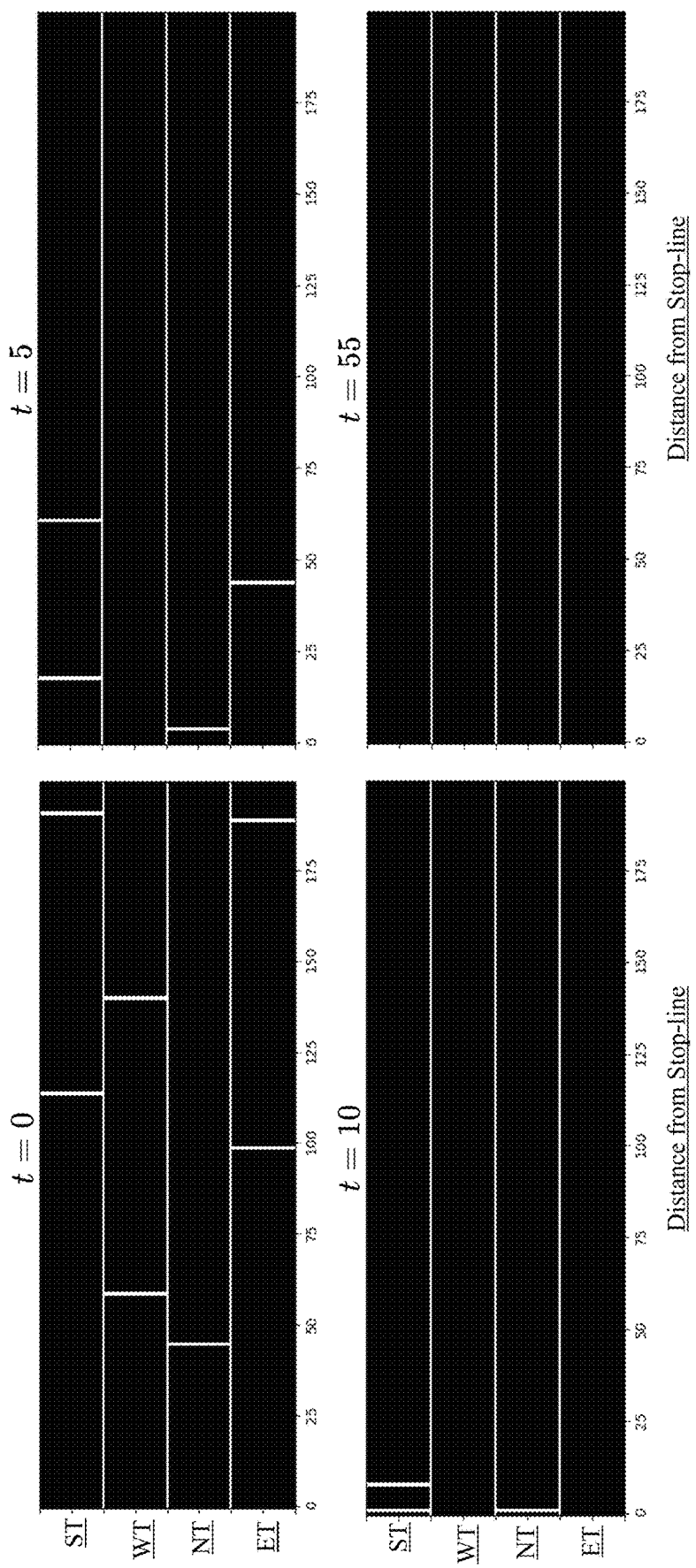
FIG. 15 is an example showing charts of different timesteps for a single rollout using a learned microscopic dynamics model.

In an example, a simple four-lane intersection network, as shown in FIG. 14, can be used to demonstrate how the system 100 uses the learned microscopic dynamics model to generate optimal control actions. In this example, all approaches have single lanes on which vehicles are spawned with respect to a poisson distribution. The input module 120 receives a traffic-state from the traffic network 150 via the traffic network interface 108; which is similar to one of the snapshots shown in FIG. 15. The traffic-state also includes vehicle speed information alongside the position snapshot. FIG. 15 shows graphs of a single rollout using a learned microscopic dynamics model with snapshots taken at different timesteps; 0 seconds, 5, seconds, 10 seconds, and 55 seconds. Each snapshot consists of 4 rows representing the south-through-movement (ST), west-through-movement (WT), north-through-movement (NT), and east-through-movement (ET); and the vertical bars represent vehicle positions at that timestep. For the first 3 timesteps, the active phase allows for east-west (EW) movement, and thus, vehicles on those lanes exit the intersection.

Since, in most cases, the MCTS tree is empty at the start, the selection module 124 can select the current node. The node is then expanded and rollouts are simulated from this node. The rollout is performed using the rollout-policy described herein and the consequent rollout trajectory is shown in FIG. 15. The rewards received from these rollouts are backed-up to the selected node to estimate the node value. The resulting tree is shown in FIG. 16A.

In this way, the selection module 124 can estimate the action values for different possible actions to determine the action to be taken at the current state. In preferable cases, the selection module 124 performs multiple rollouts to receive a cumulative sum of discounted rewards or returns to update the action value $Q^\pi(s, a)$. Since each rollout may give a noisy return for the value, performing multiple rollouts can advantageously reduce noise on the action value estimate. The rollouts can be backed up by using the reward determined from the rollout to update the action value $Q^\pi(s, a)$ using Equation (0).

In a second iteration, the selection module 124 randomly selects one of the child nodes of the previously evaluated node; as none of the child nodes have been evaluated. The previous expansion, simulation and backpropragation steps are performed for the selected node. As the tree fills up with evaluated nodes, node selection for future iterations happens using UCB, as described herein. The node value estimates become increasingly accurate with each MCTS iteration as can be seen from the changing value estimates in FIGS. 16A to 16C. The optimal action at a state is chosen based on whichever action leads to higher-value state. For the current state, an extend action provides a better value of −11 as compared to −82 for a change action. For the extend action, it is performed at the current state and the above procedure is repeated at the next timestep with an empty tree.

Figure 16C:
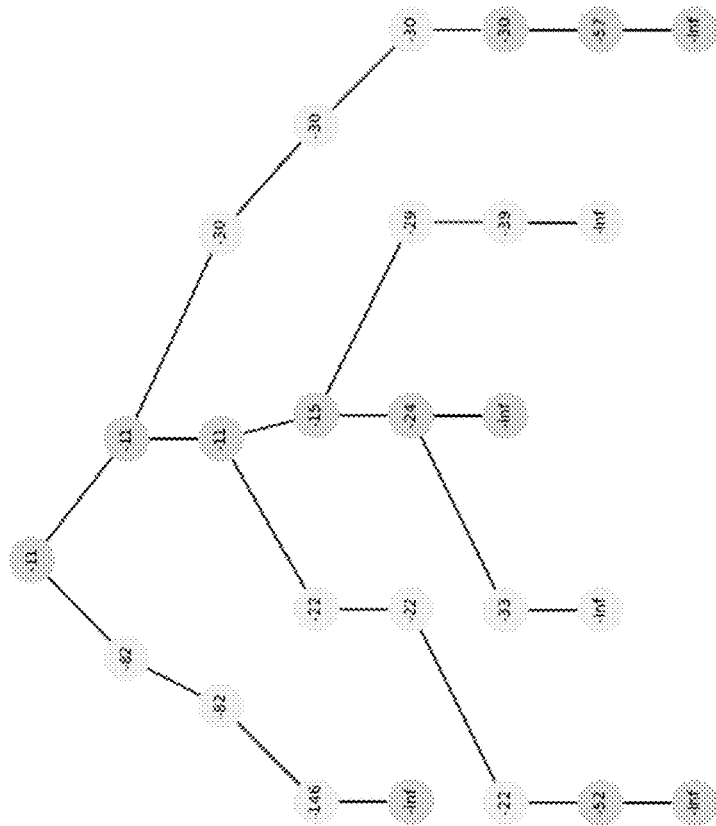
FIG. 16C is a diagram of an example of a MCTS tree after twenty iterations.
Figure 16B:
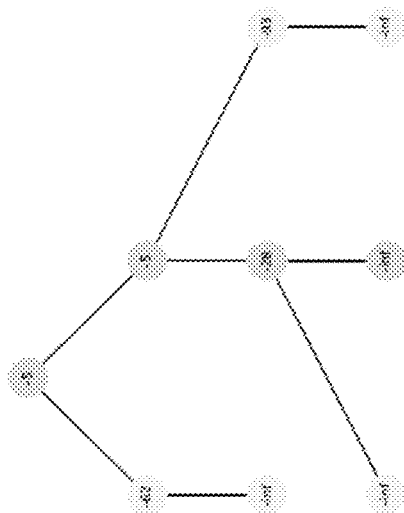
FIG. 16B is a diagram of an example of a MCTS tree after five iterations.
Figure 16A:
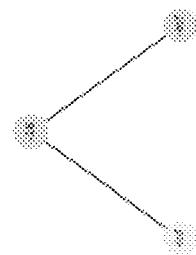
FIG. 16A is a diagram of an example of a MCTS tree after one iteration.

FIG. 16A shows the MCTS tree after one iteration, FIG. 16B shows the MCTS tree after five iterations, and FIG. 16C shows the MCTS tree after twenty iterations. Each of the iterations use the input of the traffic state shown in FIG. 15 at t=0. Each MCTS iteration adds a newly evaluated node to the tree. Lighter-shaded nodes represent the traffic state in which one of the phases is in yellow phase. Actions leading to lighter-shaded nodes are change actions while the remaining actions are extend actions, which extend the current phase. Node-texts denote the state-value V(s) of the node, such that the optimal actions at state s are chosen based on which action leads to high-value states.

This example illustrates that the present embodiments, through the combination of a learned traffic dynamics model and advanced traffic search approaches, such as MOTS, allows for prediction of future traffic states and the generation of optimal traffic control actions. This allows the use of richer observations for solving traffic system control tasks in a manner that can work with wide variety of traffic demands as well as intersection layouts.

Figures 5A, 5B, 5C:
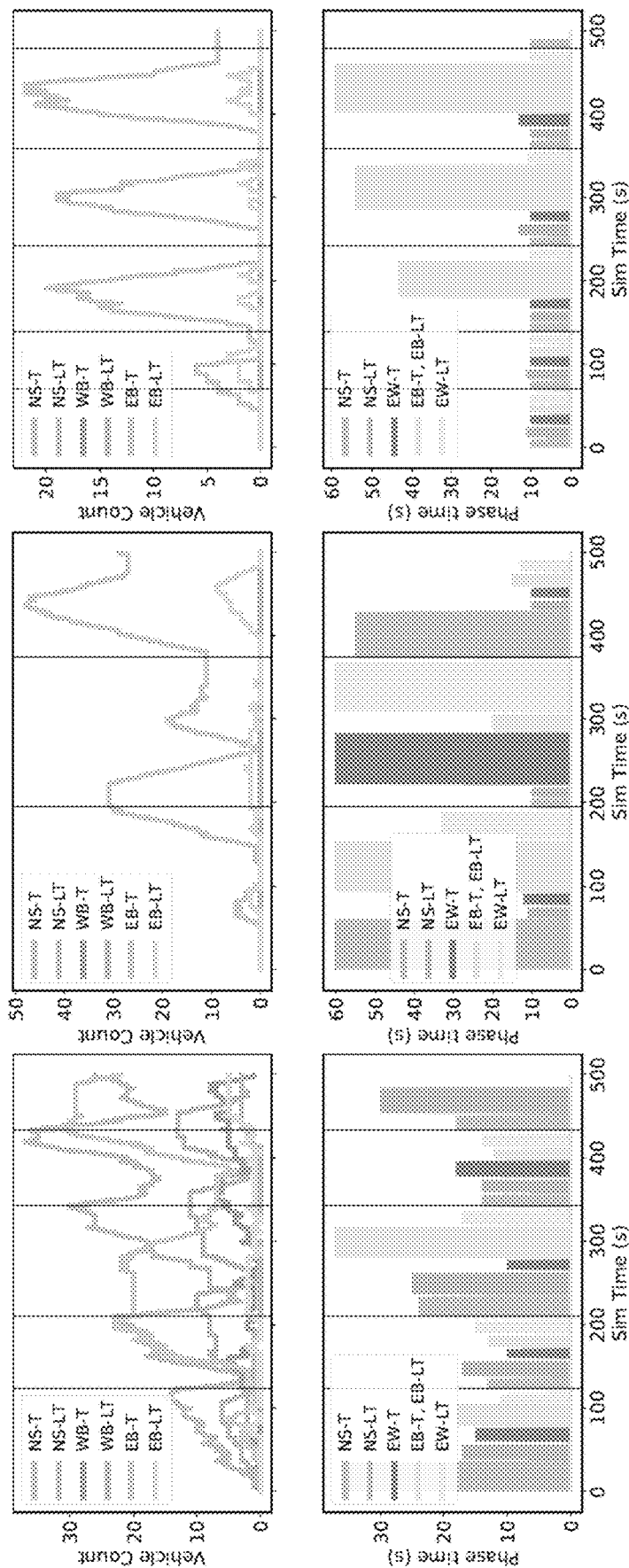
FIG. 5A is chart of vehicle count and phase time showing a Deep Q-Networks (DQN) agent's trajectory on training demand.
FIG. 5B is a chart of vehicle count and phase time showing a Deep Q-Networks (DQN) agent's trajectory on test demand.
FIG. 5C is a chart of vehicle count and phase time showing a Deep Q-Networks (DQN) agent's trajectory on test demand.

An example experiment of training dynamics memorization in model-free in comparison to model-based approaches can be observed in FIGS. 5A to 5C. A DQN agent can be trained on regular demand for the intersection (shown in FIG. 5A) and tested on a modified demand which only consists of demand from the heaviest (i.e., eastbound) approach (shown in FIG. 5B). The DQN agent is observed to award large phase times to eastbound phases on the test demand (shown in center charts), but it also erroneously grants it to the NS-T phase even though that movement has no demand. This is because the DQN agent observed heavy NS-T demand during its training. In significant contrast, we notice the model-based agent (shown in FIG. 5C) consistently awarding higher phase times to only eastbound demand phases with minimal errors. The negative effects of dynamics memorization could be even further exaggerated if the test demand included larger volumes of southbound and westbound approaches which had the lowest volumes during training. While not shown due to space limitations, the model-free agent's trajectory plots show high variance with each rollout as compared to the model-based agent's trajectory plots which remain fairly consistent and stable across multiple runs.

Figure 6:
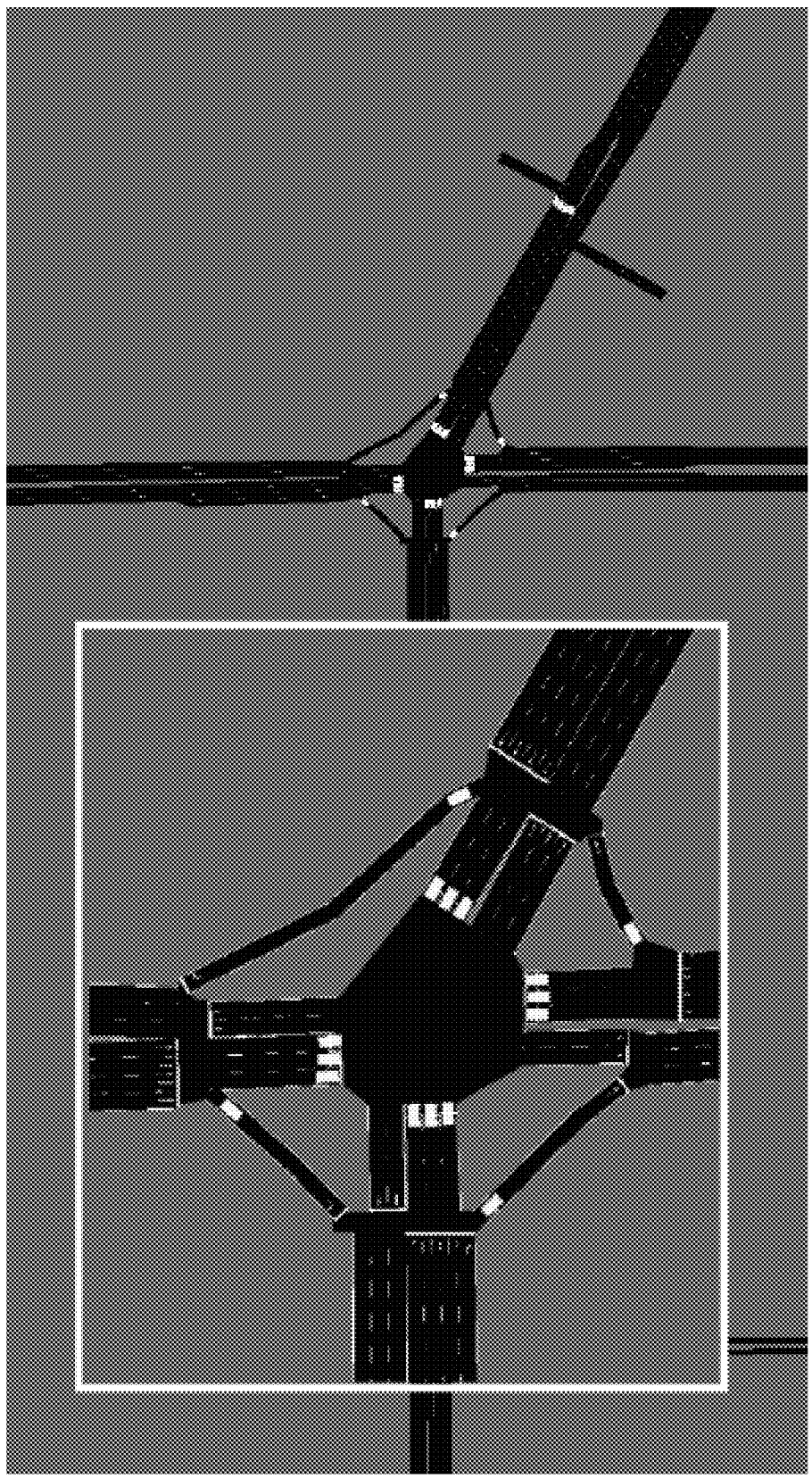
FIG. 6 is a street diagram of an example traffic intersection of the Luxiang road and Lize road intersection in Wujiang District, Suzhou, China.

FIG. 5A shows the DQN agent's trajectory on training demand. FIG. 5B shows the DQN agent's trajectory on test demand. FIG. 5C shows the model-based rollout agent's trajectory on test demand. NS-T, EW-T, EB-T and WB-T refers to through demand from north-south bound, east-west bound, eastbound and westbound directions respectively. Similarly NS-LT, EW-LT, EB-LT and WB-LT refers to left-turning demand in the respective directions. In this example experiment, a simulation of urban mobility (SUMO) network, shown in FIG. 6, was used.

In an example RL approach, Q-learning is an off-policy Temporal Difference (TD) approach that learns the action-value function by attempting to approximate the action-values under the optimal policy. On taking action $a_t$ when the given state is $s_t$, reinforcement learning environment then returns the next state $s_{t+1}$ and reward $r_{t+i}$ to the agent to generate action $a_{t+1}$. And for step size, $\alpha \in (0,1]$, the Q-values are updated using:

$$Q(s_t, a_t) \leftarrow (1 - \alpha)Q(s_t, a_t) + \alpha\left(r_{t+1} + \gamma \max_a Q(s_{t+1}, a)\right) \quad (1)$$

The exploration policy takes a random action with some small $\epsilon > 0$, while the exploitation or test time policy is greedy action selection using the learned action-value estimates. The action-values can be stored in a tabular data-structure which is called Tabular Q-learning, or the values can be approximated by function approximators like deep neural networks, which is called Deep Q-learning. In TSC tasks, where the state space can be high dimensional, the latter option of function approximation is preferred, as it prevents the need for coarser state definitions.

In another approach, rollout algorithms are a decision-time planning algorithm that works with simulated experiences generated from the model. Trajectories are generated from each allowed action at the given state $s_t$, by following a given policy. Action-values at the given state can be estimated by averaging returns over these simulated trajectories. After completing a pre-specified number of simulations, the action with the highest value is chosen, and the process repeats at the next state $s_{t+1}$. The policy being followed during these simulations (rollouts) is called a rollout policy, which may be a uniform policy, or a prior policy over which the algorithm improves upon. The time required by the rollout policy to generate actions at a state depends on many factors, for example: the number of allowed actions that have to evaluated, the number of simulated trajectories per action (n), the horizon of the simulated trajectories (h) and the time taken by the rollout policy to generate actions. In situations with limited computational time and resources, there must be a careful balance between action-value estimate accuracy compared with computation. One advantage of rollout algorithms is that the simulated trajectories can be generated in parallel, which can greatly reduce the computational time requirement. Rollout algorithms are simple to implement as they neither store any value estimates from timestep to timestep, nor do they learn a value function over the state space or state-action space. The generated trajectories following the rollout policy need not extend to the terminal state and can be truncated early, which is useful for tasks that do not have a finite horizon or have long episodes. The final state can be evaluated and its value used to estimate a calculation of action-values at state $s_t$ using the n-step TD formulation.

In another approach, similar to the rollout algorithm, Monte Carlo Tree Search (MCTS) is also a decision-time planning algorithm that works with simulated experiences. MCTS creates a tree of future states by incrementally adding nodes on promising branches with each sampled trajectory. The policy used to traverse the tree is called the tree policy and is different from the rollout policy used for evaluation of leaf nodes. Upper Confidence Bound (UCB) selection is one of several choices for the tree policy, which uses already generated node value estimates to balance between exploration and exploitation. UCB, as shown in Equation (2), selects the action for state $s_t$ at timestep t, using current action-value estimates $Q_t$, action selection counter $N_t$, and constant c that controls the degree of exploration. Simulated returns from state-action pairs are averaged to estimate the pair's value.

$$a_t = \text{argmax}_a \left[ Q_t(a) + c\sqrt{\frac{\log t}{N_t(a)}} \right] \quad (2)$$

Figure 7:
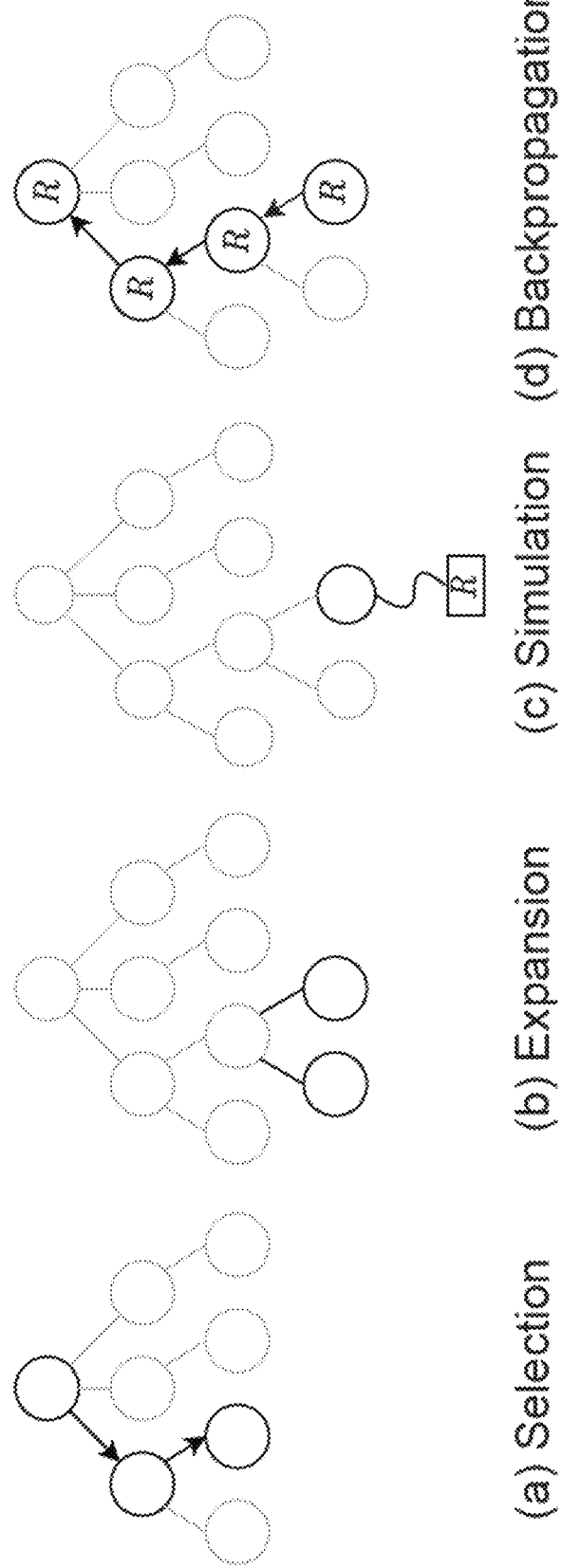
FIG. 7A is a diagram of an example of a selection step for a Monte Carlo Tree Search (MCTS)
FIG. 7B is a diagram of an example of an expansion step for the MCTS.
FIG. 7C is a diagram of an example of a simulation step for the MCTS.
FIG. 7D is a diagram of an example of a backpropagation step for the MCTS.

As shown in the diagrams of FIGS. 7A to 7D, the four major steps of the MCTS algorithm are:
(1) Selection: Use the tree policy to reach a leaf node (FIG. 7A);
(2) Expansion: If the leaf node is non-terminal, expand the tree by adding child nodes to the leaf node (FIG. 7B);
(3) Simulation: Use the rollout policy to simulate the trajectory up to a terminal state or some predefined horizon (FIG. 7C); and
(4) Backup: Action values of the traversed path inside the tree are updated using the returns of the simulated episode (FIG. 7D).

In some cases, when the selection module 124 traverses the tree, it maintains a dictionary object (also known as hash tables) where a key can represent a node and value is a set of child nodes. Node entries where the corresponding dictionary object is empty represents a leaf node. Terminal states are states after which the environment ends and needs to be restarted. In an example, where an environment horizon is set to be 500, any state that corresponds to an elapsed time beyond 500 represents a terminal state. In another example, a predefined horizon can be the end of a single phase cycle.

In various cases, model-based and model-free RL approaches can be applied to traffic signal control tasks. Variations and various training techniques of dynamics models can be used, as well as for model-free agents.

For dynamic models, one approach is to jointly model a complete edge (consisting of multiple traffic lanes) by learning a model that works with a multi-lane state and predicts the state at the next timestep. This model is referred to as an 'edge-lever' model. Other approaches can choose to model at a 'lane-level', which uses a lane state, or at a 'vehicle-level', which uses a vehicle state to predict future vehicle states.

Modelling lane change behaviors can be easier in edge-level models, but both edge-level and lane-level models can be harder to train and be more error-prone than vehicle-level models. Empirically, vehicle-level models converge quickly owing to their simple state specification and their usage ensures conservation of vehicle count, which otherwise has to be learned by the lane and edge-level models. Thus, embodiments of the present disclosure preferably learn a vehicle-level model $m_{veh}$ that takes in position $l_{t-1}^i$ and speed $v_{t-1}^i$ of vehicle i on lane j at timestep t−1, position and velocity of next downstream vehicle i−1, phase history $\phi_{t-1}^j$, and current action $a_{t-1}$, to predict the position and velocity of vehicle i at timestep t; as illustrated in Equation (3) and FIG. 8. The phase history $\phi_{t-1}^j$ is a x timestep history of phases corresponding to lane j, where x can be set to 10 after hyperparameter search. All position $l_i \in [0,1]$ and velocity $v_i \in [0,1]$ inputs can be normalized by a detected or received length and speed limit values associated with the lane.

$$l_t^i, v_t^i = m_{veh}(l_{t-1}^i, v_{t-1}^i, l_{t-1}^{i-1}, v_{t-1}^{i-1}, \phi_{t-1}^j, a_{t-1}) \quad (3)$$

Figure 8:
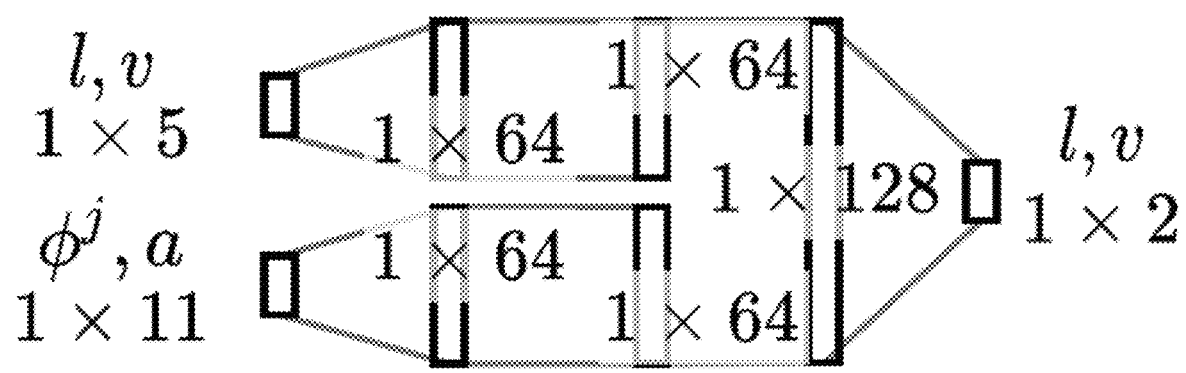
FIG. 8 is a diagram of an example architecture for a vehicle-level dynamics model.

FIG. 8 illustrates a diagram of an example of a vehicle-level dynamics model architecture. The model takes in position and speeds of vehicles i and i−1, as well as, lane phase history and lane action as inputs. Input can also include a boolean representing the existence of downstream vehicle i−1. The output includes position and speed of vehicle i. In this case, the network includes the following layers: four fully-connected (FC) layers to embed both inputs with two layers each, followed by concatenation and another couple of FC layers. The layers use a ReLU non-linear activation.

The learned model $m_{veh}$ is effectively an approximate simulator, but one that is (a) specifically learned from observational data and (b) has lower computational cost compared to a full microsimulator. The model can be trained from, for example, simulations, from connected vehicles environments in real-life, or by using real-life high-fidelity video detection.

Figure 9:
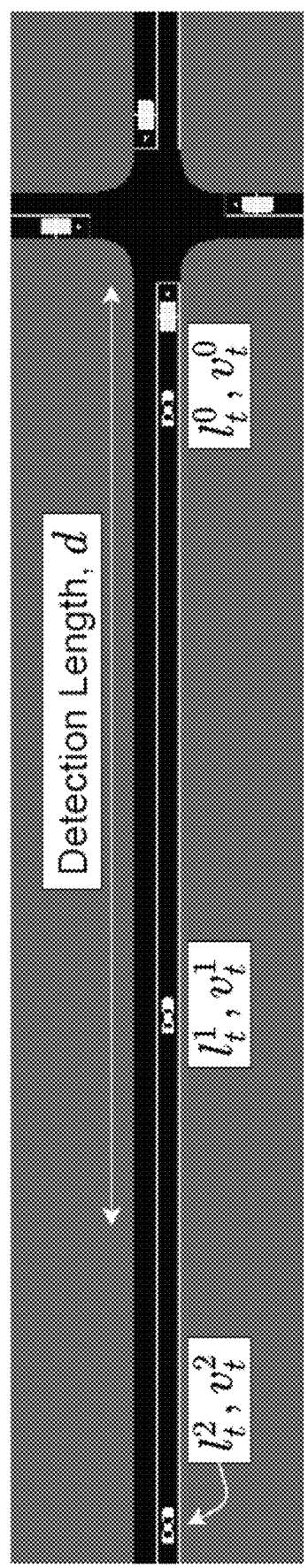
FIG. 9 is a street diagram for a single-lane four approach intersection that is controlled by a random action-selection agent.

In an example, the vehicle-level model can be trained on a dataset collected on the example SUMO network shown in FIG. 9. The artificially generated SUMO network in this example has a single-lane four approach intersection. The network receives artificially generated, platoon-like demand which varies across the different intersection approaches. In this example, a change action is randomly selected to a timestep within the minimum and maximum allowed phase-times to ensure different dynamics are explored during the collection of datasets.

The vehicle-level model architecture, as exemplified in FIG. 8, can consist of multiple fully-connected (FC) layers interleaved with non-linear activation functions. In an example, vehicle attributes, lane phase history, and lane action can be embedded separately before they are concatenated and passed into the final FC layers. In this example, the model is trained using a train and test split of 70 to 30 to prevent overfitting; however, any suitable split may be used.

Figure 10:
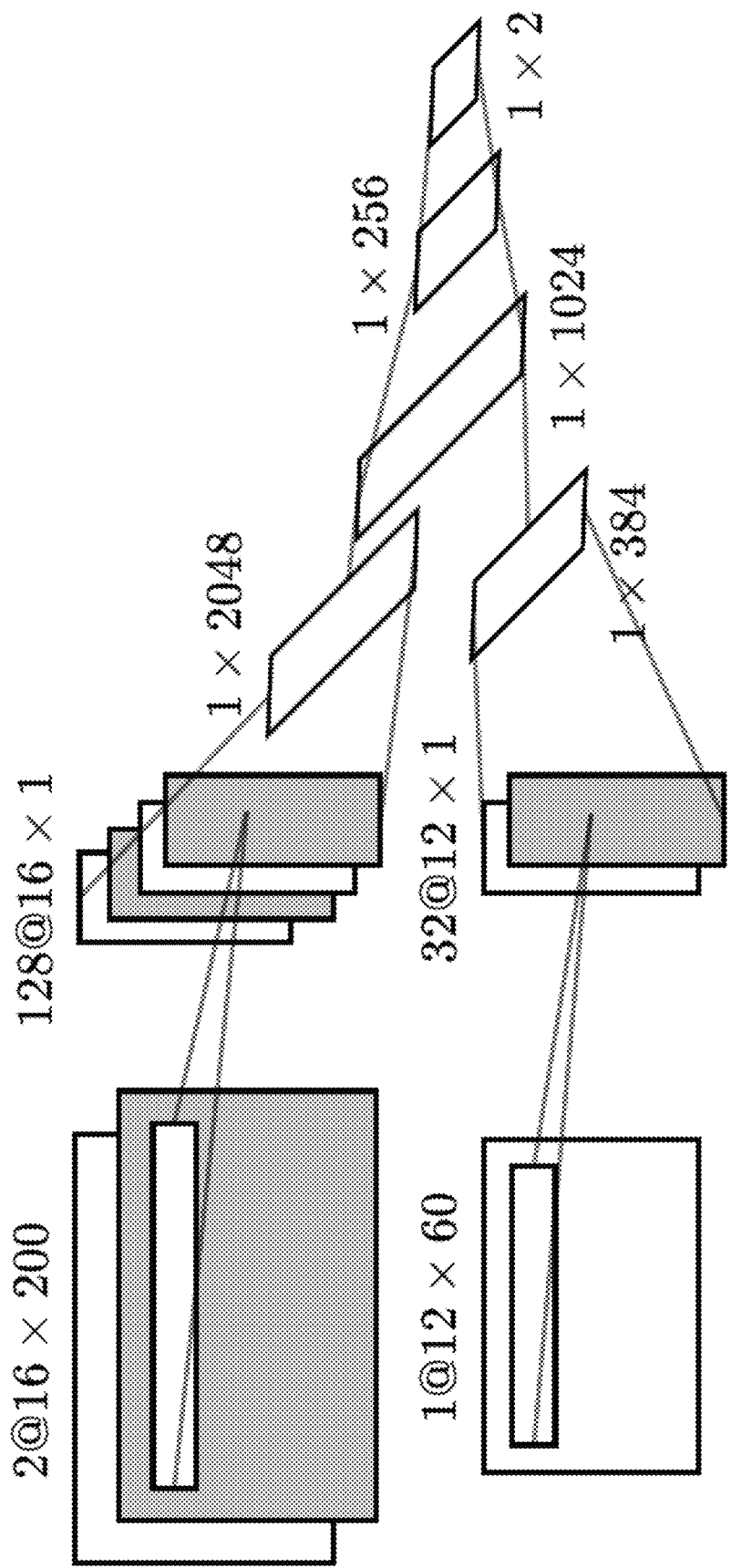
FIG. 10 is a diagram of an example architecture for a model-free DQN agent.

In a particular case, a double deep Q-network (DDQN) can be used as a model-free agent; which utilizes a parallel target network to address possible overestimation bias of DQN. A diagram of the network used is shown in FIG. 10. The network takes in a concatenated vehicle position and speed matrices, along with a phase history matrix, as an input state. The network outputs action-values for extend-change actions for a given state. The example network includes the following layers: convolution, flatten, concatenation, and finally, a trio of dense layers. Layers are interleaved with non-linear ReLU activations. In an example, the DDQN network can be trained using the APEX algorithm; which is a distributed synchronised implementation of DQN using RLlib library. In this example, the target network can be updated every 5000 timesteps, discount factor is set at 0.99, buffer size if kept at 50000 timesteps while $\in$-greedy is used as the exploration policy during training.

Vehicles can be determined to be only visible to the agent if they are within detection length d from the stop-line of the agent-controlled traffic junction. With the discretization length set to 1 m, a discretized vehicle position matrix is combined with the vehicle speed matrix and phase history matrix to form the agent's state space as shown in the example of FIG. 10. The vehicle position and speed matrix can have a dimension of the number of incoming lanes of the junction×detection length, (16×200), while the phase history matrix can have dimensions of the number of lane movements×history length, (12×60).

The agent's action space consists of two actions: A={extend, change}; where extend represents extension of current phase, and where change represents switching to the next phase in the phase order (assuming a fixed phase order). Performance of model-free approaches can vary significantly based on the action space encoding, while model-based approaches are not as susceptible to performance variation because the tree of future states is independent of how exactly actions are represented.

The reward given to the agent at timestep t is equal to the negated sum of queue lengths (the larger the sum, the worse the reward) over all lanes at the agent-controlled intersection. Vehicles travelling below a threshold speed (e.g., 2 m/s) are considered to be part of the queue. If $q_t^j$ represents the queue length at lane j of the controlled intersection, the reward for the intersection can be written as:

$$r_t = \Sigma_j q_t^j \qquad (4)$$

For a rollout agent, the rollout policy picks a random timestep between a minimum and a maximum green time to perform the change action; where green time is the time a particular direction of the intersection has a green light. This is repeated until, for example, a single phase cycle is completed with rewards obtained over this cycle used to estimate the value. In an example of a single phase cycle, if a phase cycle includes 5 phases (P1, P2, P3, P4, P5) and the current state is in phase P2, in the rollouts, actions will continue to be performed until phase P2 is returned to after traversing through the other phases. In an example, 10 rollouts can be performed to evaluate each action, and a maximum value over all evaluations is considered as the action-value. For MCTS, nodes are evaluated using the same rollout policy used for rollouts with a maximum of, for example, 5 node evaluations for estimating node values.

Q-learning learns a policy within its Q-network for all states and returns policy for a state by performing a forward pass through the Q-network. On the other hand, model-based approaches pretrain a dynamics model, but then require significant computation at run-time to produce an action for each specific state encountered; such that the computation is often required to be online.

Example experiments were performed by the present inventors on the SUMO simulator to simulate traffic for a single intersection network. In the example experiments simulated the four-street intersection of Luxiang road and Lize road found in the central urban area of Wujiang District, Suzhou, China; shown in FIG. 6. Directional flows are observed in the morning and afternoon peak hours: heavier demand exists in the eastbound and northbound directions during mornings and switches to westbound and southbound directions during evenings. Controllers were trained and evaluated during morning period demands. The average traffic flows for each approach were 180 vehicles/hour for westbound, 864 vehicles/hour for northbound, 1692 vehicles/hour for eastbound and 648 vehicles/hour for southbound. The demand to the eastbound and southbound approaches were fed through upstream traffic lights while vehicles were directly spawned on the upstream lanes of westbound and northbound approaches. This translates to a platoon-like demand for eastbound and southbound approaches within the simulation. A test demand was also defined that deviated significantly from the aforementioned train demand by only allowing the eastbound demand throughout the length of the training episode.

The traffic light at the main intersection is a five-phase signal cycle that includes the following phases: north-south (NS) through, NS left-turning, east-west (EW) through, eastbound (EB) through with EB left-turning, and EW left-turning. The minimum and maximum time limits for a non-intermediate phase were set to 10 and 60 seconds respectively.

The Example experiments evaluated performance of different agents by determining cumulative queue length over the length of a simulation episode. All agents were evaluated over 10 episodes of 500 steps each. The performance of the model-based approach of the present embodiments was compared to four baselines containing fixed timing plans and a fine-tuned DQN agent. All baselines share the same phasing scheme that is used by learned agents. The four baselines were:

Police plan: This is a fixed timing plan that was used at the actual intersection. It has a cycle length of 106 seconds and shares 87 seconds of green time among all five non-intermediate phases lasting 25, 19, 20, 13, 10 seconds respectively.

Min-green plan: This is a fixed timing plan that picks minimum duration for non-intermediate phases all the time.

Max-green plan: This is a fixed timing plan that picks maximum duration for non-intermediate phases all the time.

DQN agent: This is an adaptive agent using the deep Q-learning method with the state representation described herein.

Figure 11:
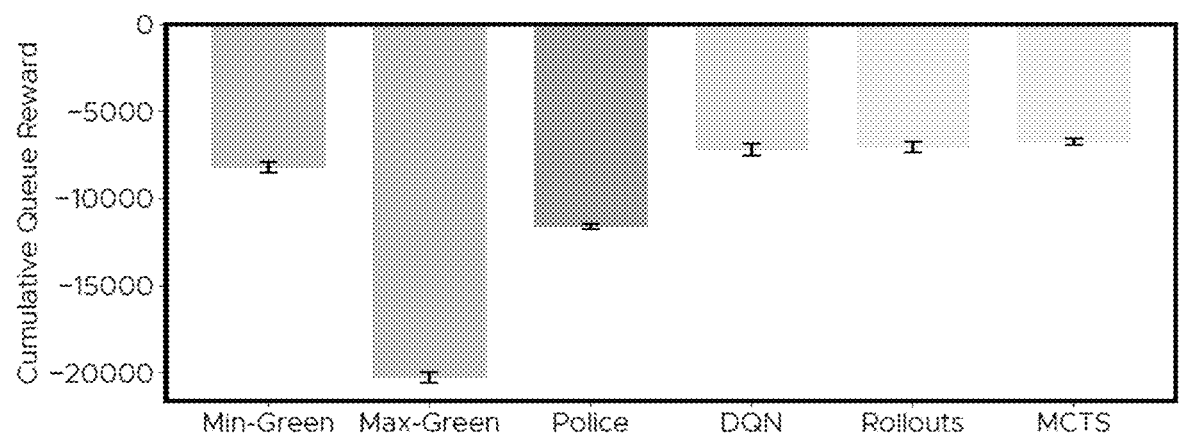
FIG. 11 is a chart of an example of evaluations of different agents on train demand for ten episodes.

The example experiments first evaluated the proposed approaches and baselines over the demand on which they are trained, as shown in the graph of FIG. 11. Both model-based agents (rollouts and MCTS) outperform the model-free (DQN) agent; although this is not by a significant amount. The MCTS agent outperforms rollouts agent due to its powerful selective search and higher compute consumption due to more state node evaluations. FIG. 8 shows evaluations of the different agents on train demand for 10 episodes. Min-Green and Max-Green agents execute static phase selection policies awarding minimum and maximum times to all phases respectively. Police agent follows the static phase timing. DQN and Rollout agents reflect performance of model-free and model-based agents on training demand.

Figure 12:
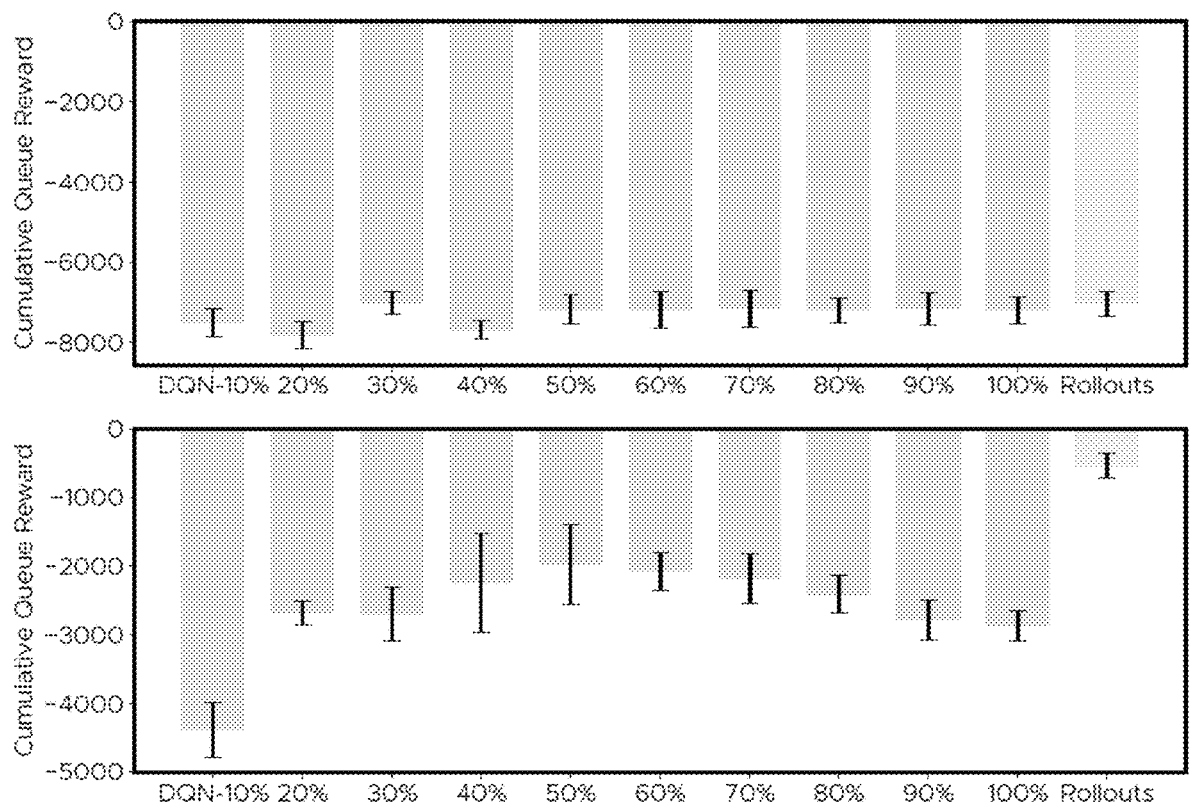
FIG. 12 are charts of an example of evaluations of DQN training checkpoints and Rollout agent on train (top) and test (bottom) demands.

FIG. 12 illustrates evaluations of the DQN training checkpoints and the Rollout agent on train (top chart) and test (bottom chart) demands. The DQN agent quickly converges to its final cumulative reward values as seen from the fairly consistent performance of checkpoints on the train demand. Performance of DQN agent checkpoints on test demand resembles that of overfitting curve in supervised learning, where performance on test set increases then decreases with continued training due to overfitting of the model.

In FIG. 12, overfitting of the model-free (DQN) agent is visually expressed by the shown progression of the agent's performance on train and test demands as it is continually improved based on updates created from train demand transitions. The DQN agent's test demand performance is akin to the conventional train-test curve seen in machine learning; test performance starts off well, but starts to deteriorate and worsen as the agent starts to overfit. In comparison, the model-based (rollouts) agent performs remarkably well, as it is likely to do well on unseen demands. These example experiments represent an extreme case of demand shift intended to illustrate that DQN is memorizing the training demand into it's policy learning. The results with respect to train demands (upper plot) are consistent with observations of FIG. 11.

Another interesting observation from FIG. 12 is the performance differential of the rollouts agent on the train and test demand. Since eastbound approach represents nearly 50% of total vehicle demand, rollouts agent's test reward is expected to achieve roughly 50% of its train reward. But it performs significantly better, since the eastbound approach has platoon-like demand due to the upstream intersection and the rollouts agent can coordinate with respect to that demand.

Figure 13:
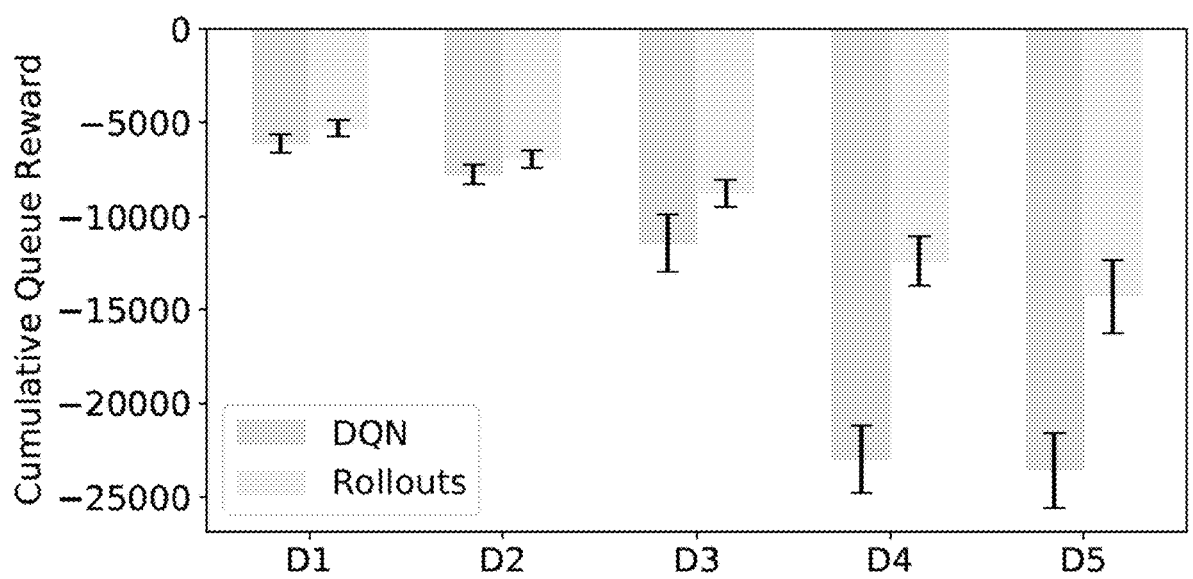
FIG. 13 is a chart showing an example comparison of DQN and Rollout agent cumulative queue reward on differing demands.

FIG. 13 illustrates a comparison of DQN to rollout agent cumulative queue reward on differing demands that vary linearly from D1 demand to D5 demand; where D1 has heavy northbound and eastbound demands, D3 has equal demands on all approaches, and D5 has heavy southbound and westbound demands (complete opposite of D1). The DQN agent and the rollout agent are both trained on D1 demand and evaluated on all demands (D1 to D5). If the cause for DQN agent's deteriorating performance is indeed memorization of its train demand as discussed previously, it should perform increasingly worse as the evaluation demand shifts further away from the train demand D1. As expected, it is observed that the deterioration in DQN agent's performance or difference with respect to rollouts agent's performance become increasingly large as these agents are evaluated from D1 to D5. The rollout agent receives higher negative rewards towards D5 as there are multiple phases to release eastbound demand in contrast to westbound demand. While DQN reduces in performance due memorization of training demand.

As the example experiments illustrate, model-free reinforcement learning approaches to traffic signal control often overfit to traffic dynamics (specifically demands) seen during training that lead to poor generalization to other demands at test time. However, a real-world intersection requires a traffic signal controller that is capable of handling all types of demands, including unseen demands. This is likely not possible for model-free controllers trained on peak demand periods. In contrast, the present embodiments use a reinforcement learning framework that uses model-based reinforcement learning, which first learns a traffic model and then applies planning techniques to generate the optimal signal control actions with respect to this model. Vehicle-level traffic dynamics model can be trained and combined with an efficient rollouts-based action selection approach.

While the example experiments generally describe determining a traffic control action on a single traffic intersection, it is understood that the present embodiments can be used to control more than one intersection; such as controlling each intersection independently.

Although the invention has been described with reference to certain specific embodiments, various modifications thereof will be apparent to those skilled in the art without departing from the spirit and scope of the invention as outlined in the claims appended hereto.

The invention claimed is:

1. A method for traffic signal control of a traffic network with a learned model, the traffic network comprising one or more intersections and sensors associated with the intersections to determine vehicle traffic approaching each intersection, the method comprising, for each timestep:
  receiving sensor readings from the traffic network, the sensor readings comprising positions and speeds of vehicles approaching each intersection;
  using a learned dynamics model that takes the sensor readings as input, predicting a plurality of possibilities for position and velocity of the vehicles approaching each intersection in a future timestep;
  determining an action for the one or more intersections by performing a tree search on the plurality of possibilities and selecting the possibility with a highest action value; and
  outputting the action to the traffic network for implementation as a traffic control action at the one or more intersections.

2. The method of claim 1, wherein the action comprises a traffic light action that comprises either an extend action or a change action, wherein the extend action extends a current phase and the change action changes the current phase to a next phase in a predefined phase cycle of a traffic light of the intersection.

3. The method of claim 2, wherein the dynamics model is trained using a simulation of traffic at the one or more intersections, the simulation artificially generates traffic demand that varies for each approach of each of the one or more intersections, where the change action is randomly selected.

4. The method of claim 1, wherein the dynamics model is trained using vehicle movement data collected from one or more intersections in real-life.

5. The method of claim 1, wherein the reinforcement model comprises a vehicle-level model that, for each vehicle, takes as input the position and the velocity of the vehicle on an associated lane, the position and velocity of a downstream vehicle, a phase history, and a current action, to predict the position and the velocity of the vehicle at the future timestep.

6. The method of claim 5, wherein the phase history comprises a timestep history of phases corresponding to the associated lane.

7. The method of claim 1, wherein the tree search comprises performing a Monte-Carlo Tree Search (MCTS).

8. The method of claim 7, wherein the MCTS comprises:
using a tree policy, traversing a tree path to reach a leaf node;
performing expansion where the leaf node is non-terminal;
expanding the tree by adding child nodes to the leaf node;
performing simulation using a rollout policy to simulate a trajectory up to a predetermined condition; and
performing backup by updating action values of the traversed path inside the tree using the performed simulation.

9. The method of claim 8, wherein the tree policy comprises performing upper confidence bound selection.

10. The method of claim 8, wherein the rollout policy selects a random timestep between a minimum and a maximum green-light time to perform the change action, and repeats the selection until a single phase cycle is completed and rewards obtained over this cycle is used to estimate an initial state value.

11. A system for traffic signal control of a traffic network with a learned model of a traffic network, the traffic network comprising one or more intersections and sensors associated with the intersections to determine vehicle traffic approaching each intersection, the system comprising one or more processors and a data storage, the one or more processors configurable to execute at each timestep:
an input module to receive sensor readings from the traffic network, the sensor readings comprising positions and speeds of vehicles approaching each intersection;
a machine learning module to, using a dynamics model that takes the sensor readings as input, predict a plurality of possibilities for position and velocity of the vehicles approaching each intersection in a future timestep;
a selection module to determine an action for the one or more intersections by performing a tree search on the plurality of possibilities and selecting the possibility with a highest action value; and
an action module to output the action to the traffic network for implementation as a traffic control action at the one or more intersections.

12. The system of claim 11, wherein the action comprises a traffic light action that comprises either an extend action or a change action, wherein the extend action extends a current phase and the change action changes the current phase to a next phase in a predefined phase cycle of a traffic light of the intersection.

13. The system of claim 12, wherein the dynamics model is trained using a simulation of traffic at the one or more intersections, the simulation artificially generates traffic demand that varies for each approach of each of the one or more intersections, where the change action is randomly selected.

14. The system of claim 11, wherein the dynamics model is trained using vehicle movement data collected from one or more intersections in real-life.

15. The system of claim 11, wherein the reinforcement model comprises a vehicle-level model that, for each vehicle, takes as input the position and the velocity of the vehicle on an associated lane, the position and velocity of a downstream vehicle, a phase history, and a current action, to predict the position and the velocity of the vehicle at the future timestep.

16. The system of claim 15, wherein the phase history comprises a timestep history of phases corresponding to the associated lane.

17. The system of claim 11, wherein the tree search comprises performing a Monte-Carlo Tree Search (MCTS).

18. The system of claim 17, wherein the MCTS comprises:
using a tree policy, traversing a tree path to reach a leaf node;
performing expansion where the leaf node is non-terminal;
expanding the tree by adding child nodes to the leaf node;
performing simulation using a rollout policy to simulate a trajectory up to a predetermined condition; and
performing backup by updating action values of the traversed path inside the tree using the performed simulation.

19. The system of claim 18, wherein the tree policy comprises performing upper confidence bound selection.

20. The system of claim 18, wherein the rollout policy selects a random timestep between a minimum and a maximum green-light time to perform the change action, and repeats the selection until a single phase cycle is completed and rewards obtained over this cycle is used to estimate an initial state value.

* * * * *